(12) United States Patent
Abedinzadeh Shahri et al.

(10) Patent No.: US 11,221,061 B2
(45) Date of Patent: Jan. 11, 2022

(54) UNIDIRECTIONAL SPRING

(71) Applicants: Majid Abedinzadeh Shahri, Tehran (IR); Majid Nili Ahmadabadi, Tehran (IR)

(72) Inventors: Majid Abedinzadeh Shahri, Tehran (IR); Majid Nili Ahmadabadi, Tehran (IR)

( * ) Notice: Subject to any disclaimer, the term of this patent is extended or adjusted under 35 U.S.C. 154(b) by 43 days.

(21) Appl. No.: 16/878,651

(22) Filed: May 20, 2020

(65) Prior Publication Data

US 2020/0284328 A1 Sep. 10, 2020

Related U.S. Application Data

(60) Provisional application No. 62/849,984, filed on May 20, 2019.

(51) Int. Cl.
*F16H 25/14* (2006.01)

(52) U.S. Cl.
CPC .................... *F16H 25/14* (2013.01)

(58) Field of Classification Search
CPC ................. F16H 25/14; F16H 33/02
USPC .......... 74/89, 125, 122, 118, 116, 84 R, 112, 74/111, 405, 404, 337.5, 335, 325, 125.5
See application file for complete search history.

(56) References Cited

U.S. PATENT DOCUMENTS

| 268,963 | A | * | 12/1882 | Upton | F16H 25/14 74/55 |
| 919,006 | A | * | 4/1909 | Hancock | F16H 27/10 74/125.5 |
| 987,049 | A | * | 3/1911 | Coventry | F16H 27/10 74/125.5 |
| 6,000,298 | A | * | 12/1999 | Kato | F16H 33/02 100/282 |

FOREIGN PATENT DOCUMENTS

EP 1398540 A2 * 3/2004 ............ F16H 25/00

* cited by examiner

*Primary Examiner* — Jake Cook
*Assistant Examiner* — T. Scott Fix
(74) *Attorney, Agent, or Firm* — Bajwa IP Law Firm; Haris Zaheer Bajwa

(57) ABSTRACT

A unidirectional spring assembly for controlling a rotating rod. The unidirectional spring assembly includes a reduced disc mounted fixedly onto the rotating rod, a rotary clutch member, and a spring assembly. The reduced disc rotates synchronously with the rotating rod around a first axis. The reduced disc includes a concave surface and a push pin. The rotary clutch member includes a clutch arm and a circular slot on a side surface of the rotary clutch member. The spring assembly includes a guide rod configured to move along a second axis, a roller attached to a distal end of the guide rod, and a spring coupled to the guide rod.

13 Claims, 23 Drawing Sheets

104

100

UNIDIRECTIONAL SPRING

CROSS-REFERENCE TO RELATED APPLICATION

This application claims the benefit of priority from U.S. Provisional Patent Application Ser. No. 62/849,984, filed on May 20, 2019, and entitled "UNIDIRECTIONAL NON-LINEAR SPRING" which is incorporated herein by reference in its entirety.

TECHNICAL FIELD

The present disclosure generally relates to spring assemblies, and more particularly, to a clutched unidirectional spring assembly.

BACKGROUND

Reducing energy consumption is considered as one of the most important challenges in different mechanical systems such as a robotic system. Using different types of springs is a conventional approach to reducing energy consumption in mechanical systems. A behavior of a spring may be described by a relation between an applied force to the spring and the spring deflection. Most commercially available springs have a linear behavior. It means that, in these commercially available springs, there is a linear relation between the applied force to the spring and the spring deflection. However, numerous studies have shown that nonlinear springs may be more effective in reducing energy consumption of mechanical systems in comparison with springs. In this regard, different spring assemblies with nonlinear characteristics have been developed.

On the other hand, most robotic tasks may be associated with some reciprocating motions in a robotic system. In order to reduce energy consumption of a robotic system during performing of a reciprocating task, a required force for performing the reciprocating task may be separated into two forces. One force of these two forces may be associated with a forth motion of the reciprocating task and the other force of these two forces may be associated with a back motion of the reciprocating task. Therefore, if a spring assembly is able to generate two independent forces during a reciprocating task, the spring assembly may be suitable to be used for performing reciprocating tasks in a robotic system. There is, therefore, a need for a system that is able to generate two independent forces for two opposite motions of a reciprocating task in a mechanical system.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary unidirectional spring assembly for a rotating rod. In an exemplary embodiment, the unidirectional spring assembly may include a reduced disc, a rotary clutch member, and a spring assembly. In an exemplary embodiment, the reduced disc may be mounted fixedly onto the rotating rod. In an exemplary embodiment, the reduced disc may be configured to rotate synchronously with the rotating rod around a first axis responsive to rotation of the rotating rod around the first axis. In an exemplary embodiment, the reduced disc may include a concave surface on an outer periphery of the reduced disc and a push pin attached to a side surface of the reduced disc.

In an exemplary embodiment, the rotary clutch member may be mounted onto the rotating rod, and immediately to the reduced disc. In an exemplary embodiment, the rotary clutch member may be mounted onto the rotating rod in a manner that the rotary clutch member is constantly in contact with the rotating rod but not rotating synchronously with the rotating rod. In an exemplary embodiment, the rotary clutch member may be configured to rotate around the first axis. In an exemplary embodiment, the rotary clutch member may include a clutch arm and a circular slot. In an exemplary embodiment, the circular slot may be on a side surface of the rotary clutch member. In an exemplary embodiment, the push pin may be disposed slidably inside the circular slot.

In an exemplary embodiment, the spring assembly may include a guide rod, a roller, and a spring. In an exemplary embodiment, the guide rod may be configured to move along a second axis. In an exemplary embodiment, the roller may be attached to a distal end of the guide rod. In an exemplary embodiment, the roller may be configured to move on the outer periphery of the reduced disc. In an exemplary embodiment, the spring may be configured to urge the guide rod to move along the second axis and in a first direction.

In an exemplary embodiment, responsive to rotation of the rotating rod around the first axis and in a first rotational direction between a first angular position and a second angular position, the reduced disc may rotate synchronously with the rotating rod between the first angular position and the second angular position, and the guide rod may move up and down along the second axis due to the roller moves on the concave surface between a first end of the concave surface and a second end of the concave surface. In an exemplary embodiment, the first angular position may be associated with the first end of the concave surface.

In an exemplary embodiment, responsive to rotation of the rotating rod around the first axis and in the first rotational direction between the second angular position and a third angular position, the reduced disc may rotate synchronously with the rotating rod between the second angular position and the third angular position and the guide rod may move on a top surface of the clutch arm due to the push pin pushes a first end of the circular slot and the rotary clutch member rotates synchronously with the reduced disc.

In an exemplary embodiment, responsive to rotation of the rotating rod around the first axis and in a second rotational direction between the third angular position and a fourth angular position, the reduced disc may rotate synchronously with the rotating rod between the fourth angular position and the first angular position and the guide rod may move on the top surface of the clutch arm and the roller may move on the outer periphery of the reduced disc due to the rotary clutch member rotates synchronously with the reduced disc due to the push pin pushes a second end of the circular slot.

In an exemplary embodiment, the rotary clutch member may further include a first sub-slot intersecting the circular slot. In an exemplary embodiment, the first sub-slot may be configured to receive a first nut. In an exemplary embodiment, the first nut may be configured to be coupled with the rotary clutch member when the first nut is present in the first sub-slot. In an exemplary embodiment, responsive to rotation of the reduced disc around the first axis and in the first rotational direction between a sixth angular position and a seventh angular position. In an exemplary embodiment, the rotary clutch member may rotate synchronously with the reduced disc due to the push pin pushes the first nut.

In an exemplary embodiment, the rotary clutch member may further include a second sub-slot intersecting the circular slot. In an exemplary embodiment, the second sub-slot may be configured to receive a second nut. In an exemplary embodiment, the second nut may be configured to be coupled with the rotary clutch member when the second nut is present in the second sub-slot. In an exemplary embodiment, responsive to rotation of the reduced disc around the first axis and in the second rotational direction between an eighth angular position and a fifth angular position, the rotary clutch member may rotate synchronously with the reduced disc due to the push pin pushes the second nut.

In an exemplary embodiment, the first axis may include a main longitudinal axis of the rotating rod. In an exemplary embodiment, the second axis may include a main longitudinal axis of the guide rod.

In an exemplary embodiment, responsive to rotation of the rotating rod around the first axis and in the second rotational direction between the third angular position and the fourth angular position, the reduced disc may rotate synchronously with the rotating rod between the third angular position and the fourth angular position and the guide rod is prevented from moving along the second axis due to a first pin of the guide rod may stand on the top surface of the clutch arm. In an exemplary embodiment, the first pin may be attached to a bottom end of the guide rod.

In an exemplary embodiment, responsive to rotation of the rotating rod around the first axis and in the second rotational direction between the seventh angular position and the eighth angular position, the reduced disc may rotate synchronously with the rotating rod between the seventh angular position and the eighth angular position and the guide rod may be prevented from moving along the second axis due to a second pin of the guide rod may stand on the top surface of the clutch arm. In an exemplary embodiment, the second pin may be attached to the bottom end of the guide rod.

In an exemplary embodiment, the disclosed unidirectional spring assembly may further include a top linear bearing and a bottom linear bearing. In an exemplary embodiment, the top linear bearing may include a top guide hole. In an exemplary embodiment, the top linear bearing may be attached to a base plate.

In an exemplary embodiment, the bottom linear bearing may include a bottom guide hole. In an exemplary embodiment, the bottom linear bearing may be attached to the base plate. In an exemplary embodiment, the guide rod may be disposed slidably inside the top guide hole of the top linear bearing and the bottom guide hole of the bottom linear bearing. In an exemplary embodiment, the top linear bearing and the bottom linear bearing may be configured to limit movements of the guide rod to a linear reciprocating movement along the second axis.

In an exemplary embodiment, the concave surface may include a right segment and a left segment. In an exemplary embodiment, the right segment may be associated with the first end of the concave surface. In an exemplary embodiment, the left segment may be associated with the second end of the concave surface. In an exemplary embodiment, responsive to movement of the roller on the right segment of the concave surface, the spring may urge the reduced disc and the rotating rod to rotate around the first axis and in the second rotational direction due to the spring pushes the guide rod to move downward.

In an exemplary embodiment, the reduced disc may further include a first rod receiving hole at a center of the reduced disc. In an exemplary embodiment, the rod receiving hole may be configured to receive the rotating rod. In an exemplary embodiment, the reduced disc may include a keyway located immediately next to the rod receiving hole. In an exemplary embodiment, the keyway may be configured to receive a key of the rotating rod. In an exemplary embodiment, the key and the keyway may be configured to limit rotational movements of the reduced disc to a synchronous rotational movement with rotation of the rotating rod around the first axis. In an exemplary embodiment, the circular slot may include an arc-shaped structure. In an exemplary embodiment, the first axis may pass through a center of the arc-shaped structure.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary unidirectional spring assembly that may be able to apply two different torques to a rotational system during a reciprocating rotary motion of the rotational system. The exemplary unidirectional spring assembly may apply a first torque to the rotational system during a forth motion of the rotational system's reciprocating rotary motion. Also, the exemplary unidirectional spring assembly may apply a second torque to the rotational system during a back motion of the rotational system's reciprocating rotary motion in which the second torque is different from the first torque. Specifically, in a scenario, one of the first torque and the second torque may be equal to zero. For example, the exemplary unidirectional spring assembly may apply a first torque to the rotational system during a forth motion of a rotational system's reciprocating rotary motion and apply no torque to the rotational system during a back motion of a rotational system's reciprocating rotary motion.

Figure 1A:
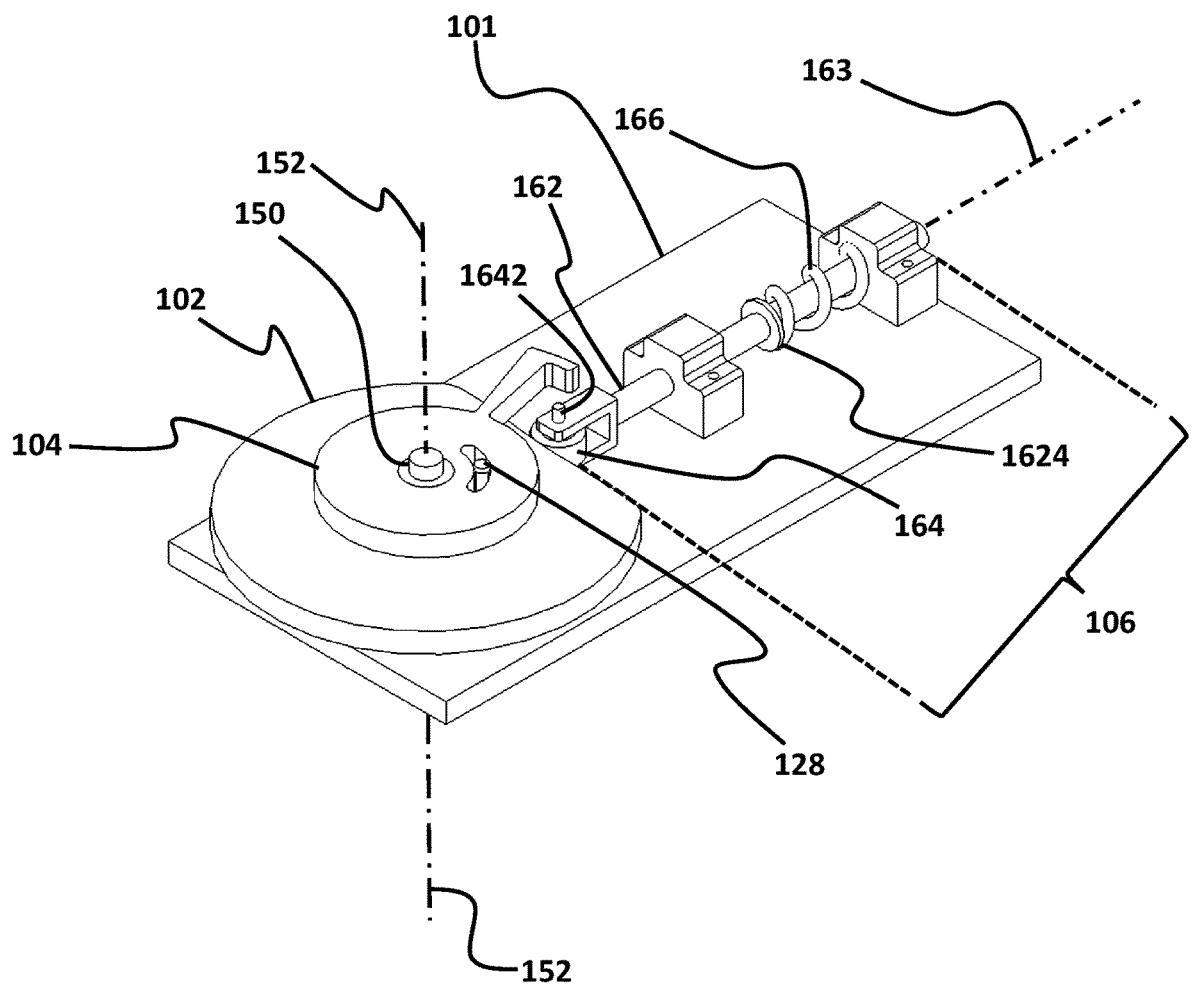
FIG. 1A illustrates a perspective view of a unidirectional spring assembly, consistent with one or more exemplary embodiments of the present disclosure.
Figure 1B:
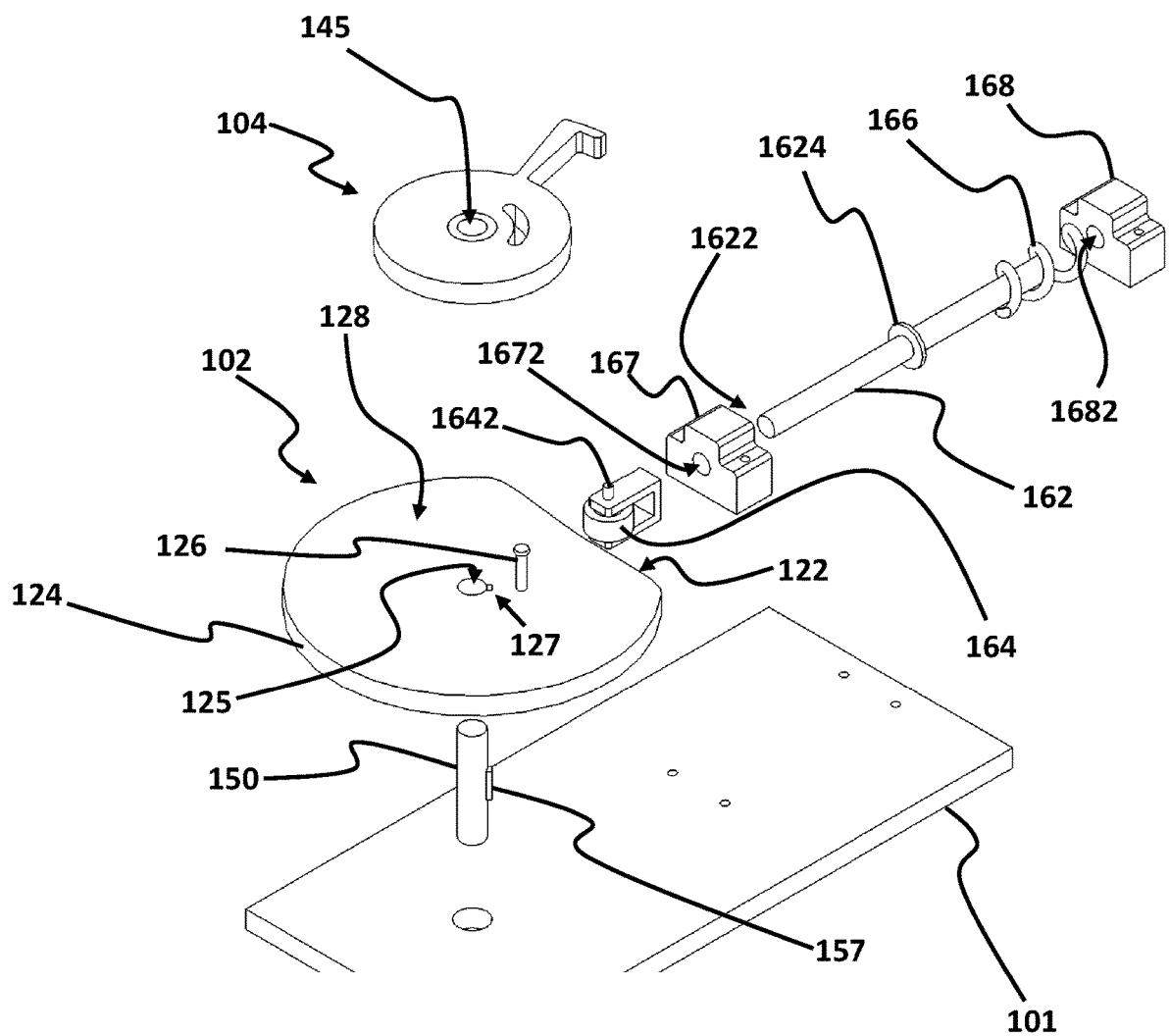
FIG. 1B illustrates an exploded view of a unidirectional spring assembly, consistent with one or more exemplary embodiments of the present disclosure.
Figure 1C:
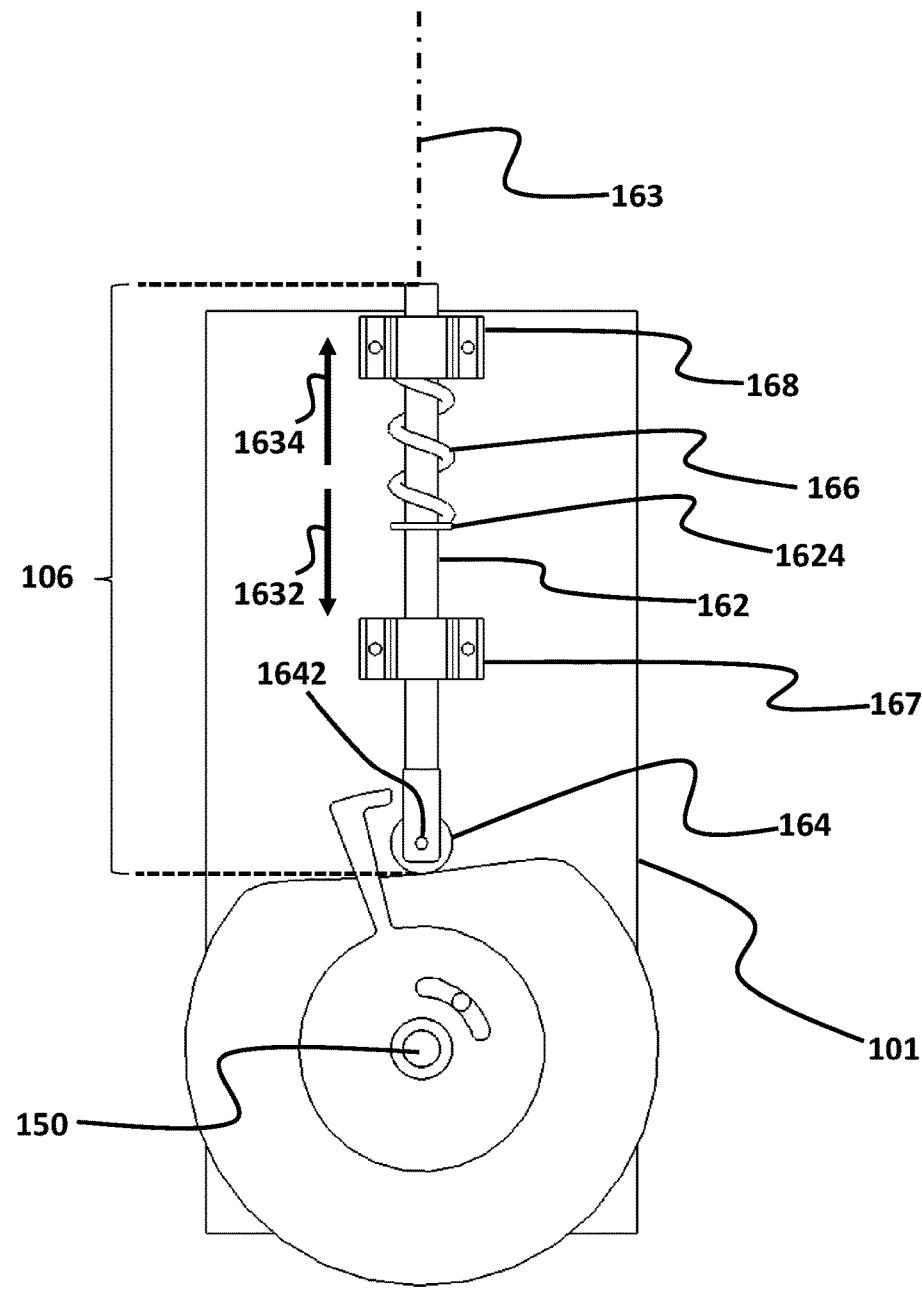
FIG. 1C illustrates a side view of a unidirectional spring assembly, consistent with one or more exemplary embodiments of the present disclosure.

FIG. 1A shows a perspective view of a unidirectional spring assembly 100, consistent with one or more exemplary embodiments of the present disclosure. FIG. 1B shows an exploded view of unidirectional spring assembly 100, consistent with one or more exemplary embodiments of the present disclosure. FIG. 1C shows a side view of unidirectional spring assembly 100, consistent with one or more exemplary embodiments of the present disclosure. As shown in FIG. 1A and FIG. 1B, in an exemplary embodiment, unidirectional spring assembly 100 may include a reduced disc 102. In an exemplary embodiment, a reduced disc may refer to a disc which may not be a complete disc and a part of the disc may be removed. In an exemplary embodiment, in order to obtain a reduced disc, a top segment of a complete disc may be removed in such a way that a concave surface is formed on an outer periphery of the complete disc. In an exemplary embodiment, a rod may be placed onto the formed concave surface. In an exemplary embodiment, during rotation of the reduced disc, the formed concave surface may urge the said rod to move upward and downward. In an exemplary embodiment, it may be understood that when the concave surface is formed on the outer periphery of the disc, the reduced disc may act as a cam. In other words, reduced disc 102 may be able to convert a rotational movement of a rotating element to a linear movement of a rod which is placed onto the formed concave surface. In an exemplary embodiment, reduced disc 102 may be configured to be mounted fixedly onto a rotating rod 150. In an exemplary embodiment, reduced disc 102 may include a first rod receiving hole 125 located at a center of reduced disc 102. In an exemplary embodiment, reduced disc 102 may be mounted fixedly onto rotating rod 150 by inserting rotating rod 150 into first rod receiving hole 125. In an exemplary embodiment, it may be understood that when reduced disc 102 is mounted fixedly onto rotating rod 150, reduced disc 102 may be attached to rotating rod 150 in such a way that any movement of reduced disc 102 relative to rotating rod 150 is prevented. In other words, when rotating rod 150 is rotating, reduced disc 102 is rotating synchronously with rotating rod 150. In an exemplary embodiment, rotating rod 150 may be configured to rotate around a first axis 152.

In an exemplary embodiment, reduced disc 102 may further include a keyway 127 located immediately next to first rod receiving hole 125. Furthermore, in an exemplary embodiment, rotating rod 150 may include a key 157 associated with keyway 127. In an exemplary embodiment, a size of keyway 127 may correspond to a size of keyway 127, and also a shape of key 157 may correspond to a shape of keyway 127. In an exemplary embodiment, when rotating rod 150 is inserted into reduced disc 102, key 157 may be inserted into keyway 127. In an exemplary embodiment, it may be understood that when key 157 is inserted into keyway 127, reduced disc 102 and rotating rod 150 may be engaged and coupled to each other and, consequently, when rotating rod 150 rotates around first axis 152, reduced disc 102 may rotate synchronously with rotating rod 150 around first axis 152. In an exemplary embodiment, rotating rod 150 may be press fitted tightly into first rod receiving hole 125. In an exemplary embodiment, it may be understood that when rotating rod 150 is press fitted tightly into first rod receiving hole 125, reduced disc 102 may be engaged and coupled to rotating rod 150 in such a way that responsive to rotation of rotating rod 150 around first axis 152, reduced disc 102 may rotate synchronously with rotating rod 150 around first axis 152. In an exemplary embodiment, synchronous rotation of reduced disc 102 with rotating rod 150 around first axis 152 may refer to a rotation of reduced disc 102 around first axis 152 at a rotational speed as same as the rotational speed of rotating rod 150 and with a rotational direction as same as a rotational direction of rotating rod 150. In an exemplary embodiment, rotating rod 150 may include a cylindrical structure. In an exemplary embodiment, first axis 152 may coincide with a main longitudinal axis of rotating rod's 150 cylindrical structure. In an exemplary embodiment, rotating rod 150 may include a circular shape, a rectangular shape, a triangular shape, or any other shapes.

Figure 2:
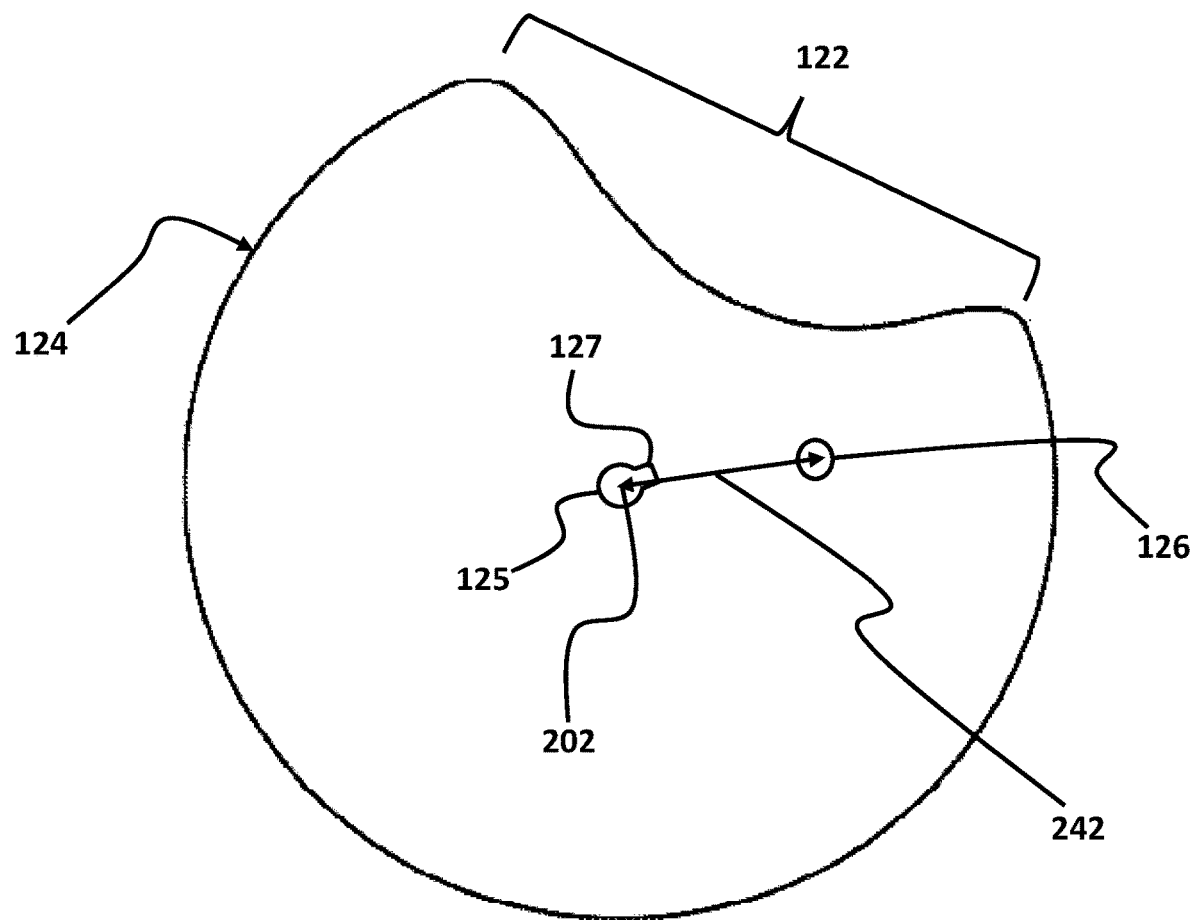
FIG. 2 illustrates a side view of a reduced disc, consistent with one or more exemplary embodiments of the present disclosure.

FIG. 2 shows a side view of reduced disc 102, consistent with one or more exemplary embodiments of the present disclosure. In an exemplary embodiment, reduced disc 102 may include a concave surface 122 on an outer periphery 124 of reduced disc 102. In an exemplary embodiment, concave surface 122 may help reduced disc 102 to act as a cam. When a rod is placed onto concave surface 122, during rotation of reduced disc 102, concave surface 122 may urge the placed rod to move upward and downward and consequently reduced disc 102 may act as a cam. In an exemplary embodiment, reduced disc 102 may further include a push pin 126 attached to a side surface 128 of reduced disc 102.

In an exemplary embodiment, unidirectional spring assembly 100 may further include a rotary clutch member 104. In an exemplary embodiment, rotary clutch member 104 may be mounted loosely onto rotating rod 150. In an exemplary embodiment, mounted loosely may refer to the fact that an inner surface of rotary clutch member is constantly in contact with an outer surface of rotating rod 150 but the engagement between rotary clutch member 104 and rotating rod 150 is not such strong that force rotary clutch member 104 to rotate synchronously with rotating rod 150. As shown in FIG. 1A, in an exemplary embodiment, rotary clutch member 104 may be mounted loosely onto rotating rod 150 and immediately next to reduced disc 102. In an exemplary embodiment, rotary clutch member 104 may be configured to rotate around first axis 152. In an exemplary embodiment, rotary clutch member 104 may include a second rod receiving hole 145 located at a center of rotary clutch member 104. In an exemplary embodiment, rotary clutch member 104 may be mounted loosely onto rotating rod 150 by inserting rotating rod 150 into second rod receiving hole 145. In an exemplary embodiment, it may be understood that when rotary clutch member 104 is mounted loosely onto rotating rod 150, rotation of rotary clutch member 104 may be independent from rotation of rotating rod 150 and, consequently, rotary clutch member 104 may not be limited to rotate synchronously with rotating rod 150 around first axis 152. In an exemplary embodiment, an inner diameter of second rod receiving hole 145 may be slightly larger than an outer diameter of rotating rod 150. For example, the inner diameter of second rod receiving hole 145 may be larger than the outer diameter of rotating rod 150 by an amount of up to 1 mm. In an exemplary embodiment, it may be understood that when the inner diameter of second rod receiving hole 145 may be slightly larger than the outer diameter of rotating rod 150, rotary clutch member 104 may rotate coaxially with rotating rod 150 around first axis 152 but rotation of clutch member 104 may not be necessarily synchronous with rotation of rotating rod 150. In an exemplary embodiment, when rotating rod 150 rotates around first axis 152, rotary clutch member 104, which is mounted loosely onto rotating rod 150, may remain stationary without any rotation.

Figure 3:
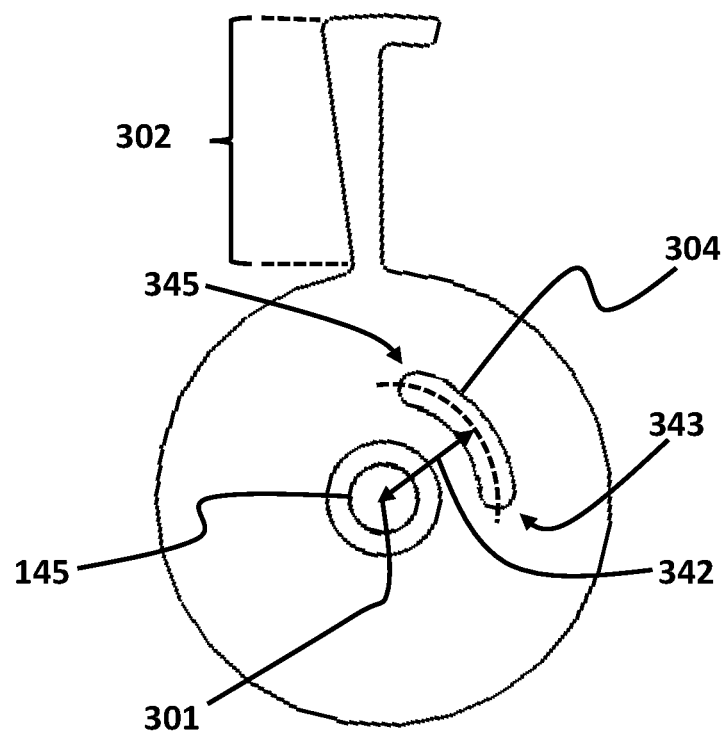
FIG. 3 illustrates a side view of a rotary clutch member, consistent with one or more exemplary embodiments of the present disclosure.

FIG. 3 shows a side view of rotary clutch member 104, consistent with one or more exemplary embodiments of the present disclosure. As shown in FIG. 3, in an exemplary embodiment, rotary clutch member 104 may include a clutch arm 302. In an exemplary embodiment, rotary clutch member 104 may further include a circular slot 304 associated with push pin 126. As further shown in FIG. 3, in an exemplary embodiment, circular slot 304 may include an arc-shaped structure. In an exemplary embodiment, first axis 152 my pass through a center of the arc-shaped structure of circular slot 304. In an exemplary embodiment, it may be understood that when first axis 152 passes through a center of the arc-shaped structure of circular slot 304, a first distance 342 between circular slot 304 and first axis 152 may remain constant during rotation of rotary clutch member 104 around first axis 152. In an exemplary embodiment, push pin 126 may be disposed slidably inside circular slot 304. In an exemplary embodiment, it may be understood that when push pin 126 is disposed slidably inside circular slot 304, push pin 126 may be allowed to move inside circular slot 304 and along a curved length of circular slot 304. Referring back to FIG. 2, in an exemplary embodiment, push pin 126 may be attached to side surface 128 of reduced disc 102 at a second distance 242 from a center 202 of reduced disc 102. In an exemplary embodiment, first distance 342 may be an equal distance as second distance 242. In an exemplary embodiment, it may be understood that when first distance 342 is an equal distance as second distance 242, push pin 126 may be able to be disposed slidably inside circular slot 304.

As further shown in FIGS. 1A-C, in an exemplary embodiment, unidirectional spring assembly 100 may further include a spring assembly 106. In an exemplary embodiment, spring assembly 106 may include a guide rod 162, a roller 164, and a spring 166. In an exemplary embodiment, guide rod 162 may be configured to move along a second axis 163. In an exemplary embodiment, guide rod 162 may move in a first direction 1632 and in a second direction 1634. In an exemplary embodiment, second axis 163 may coincide with a main longitudinal axis of guide rod 162. Furthermore, in an exemplary embodiment, second axis 163 may be perpendicular to first axis 152. In an exemplary embodiment, spring assembly 106 may further include a bottom linear bearing 167 and a top linear bearing 168. In an exemplary embodiment, bottom linear bearing 167 and top linear bearing 168 may be attached to a base plate 101. In an exemplary embodiment, bottom linear bearing 167 may include a bottom guide hole 1672 and top linear bearing 168 may include a top guide hole 1682. In an exemplary embodiment, a main axis of bottom guide hole 1672 and a main axis of top guide hole 1682 may both be aligned with second axis 163, that is, they may overlap with each other. In an exemplary embodiment, a size of bottom guide hole 1672 and a size of top guide hole 1682 may correspond to a size of guide rod 162 and a shape of bottom guide hole 1672 and a shape of top guide hole 1682 may correspond to a shape of guide rod 162. For example, guide rod 162, bottom guide hole 1672, and top guide hole 1682 may have a cylindrical shape. In an exemplary embodiment, guide rod 162, bottom guide hole 1672, and top guide hole 1682 may have any other geometrical shape. In an exemplary embodiment, guide rod 162 may be disposed slidably inside bottom guide hole 1672 and top guide hole 1682 in such a way that bottom guide hole 1672 and top guide hole 1682 limit movements of guide rod 162 to linear movements along second axis 163.

As shown in FIG. 1A and FIG. 1C, in an exemplary embodiment, roller 164 may be attached to a distal end 1622 of guide rod 162. In an exemplary embodiment, roller 164 may be disposed on a top part of reduced disc 102. In an exemplary embodiment, roller 164 may move on outer periphery 124 of reduced disc 102 when reduced disc 102 rotates around first axis 152. In an exemplary embodiment, guide rod 162 may include a lip 1624. In an exemplary embodiment, lip 1624 may have a circular shape. In an exemplary embodiment, lip 1624 may have any other geometrical shape.

As further shown in FIG. 1A and FIG. 1C, spring 166 may be disposed between lip 1624 and top linear bearing 168. In an exemplary embodiment, spring 166 may apply a downward force to lip 1624 along second axis 163 and in first direction 1632 and, to thereby, apply a downward force to guide rod 162 along second axis 163 and in first direction 1632. Consequently, in an exemplary embodiment, spring 166 may urge guide rod 162 to move downward along second axis 163 and in first direction 1632.

Figure 4A:
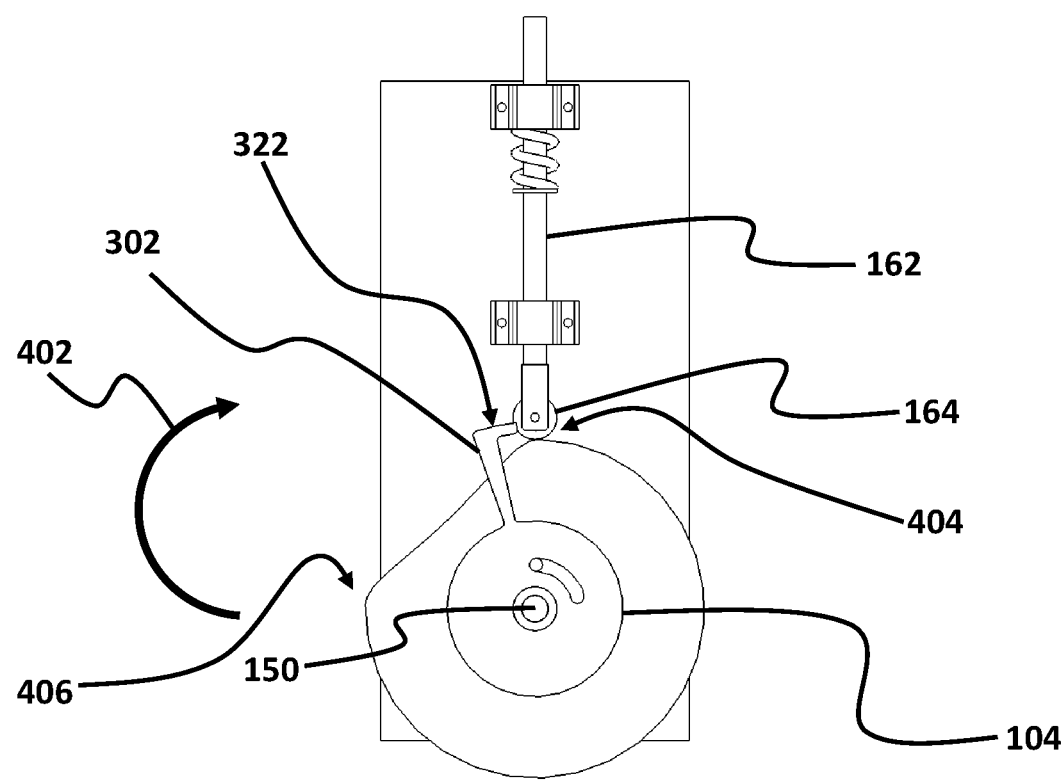
FIG. 4A illustrates a unidirectional spring assembly in a scenario in which a rotating rod and a reduced disc are at a first angular position, consistent with one or more exemplary embodiments of the present disclosure.
Figure 4B:
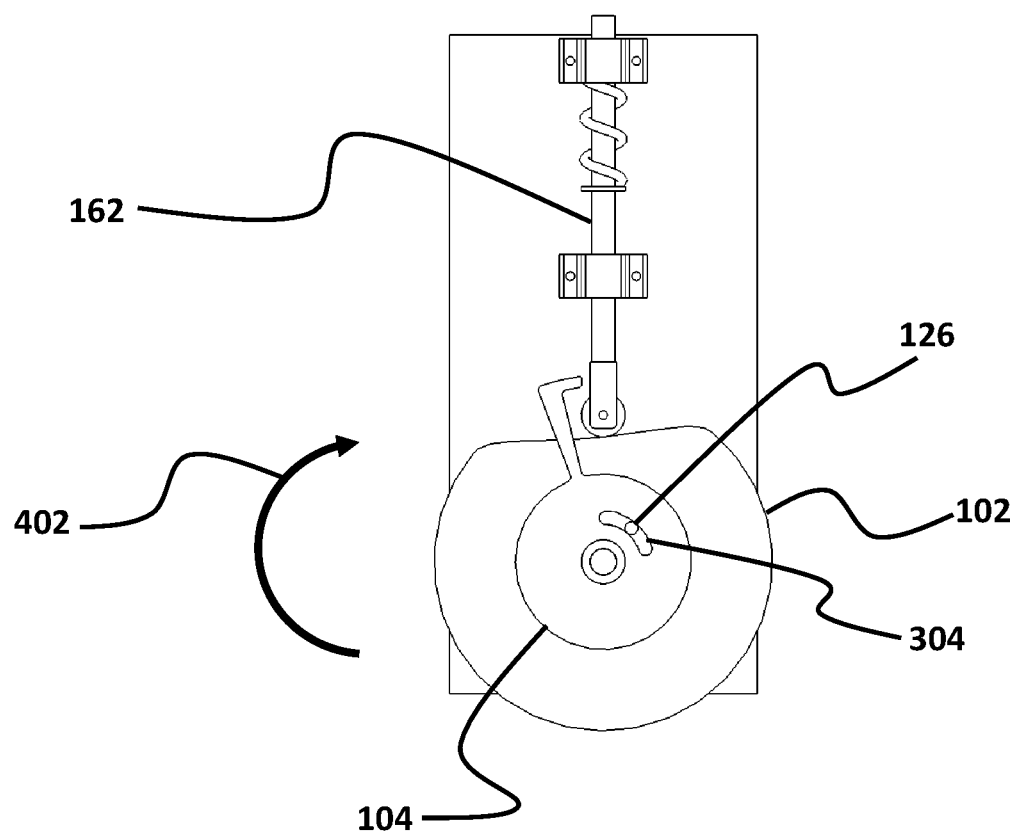
FIG. 4B illustrates a unidirectional spring assembly in a scenario in which a rotating rod and a reduced disc are moving from a first angular position to a second angular position, consistent with one or more exemplary embodiments of the present disclosure.
Figure 4C:
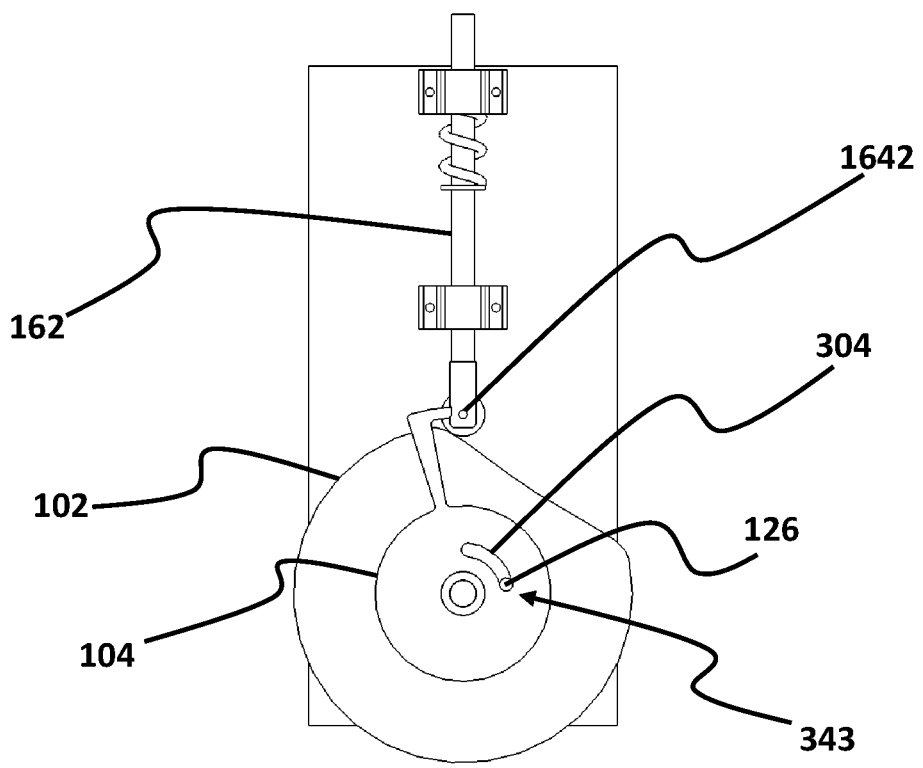
FIG. 4C illustrates a unidirectional spring assembly in a scenario in which a rotating rod and a reduced disc are at a second angular position, consistent with one or more exemplary embodiments of the present disclosure.
Figure 4D:
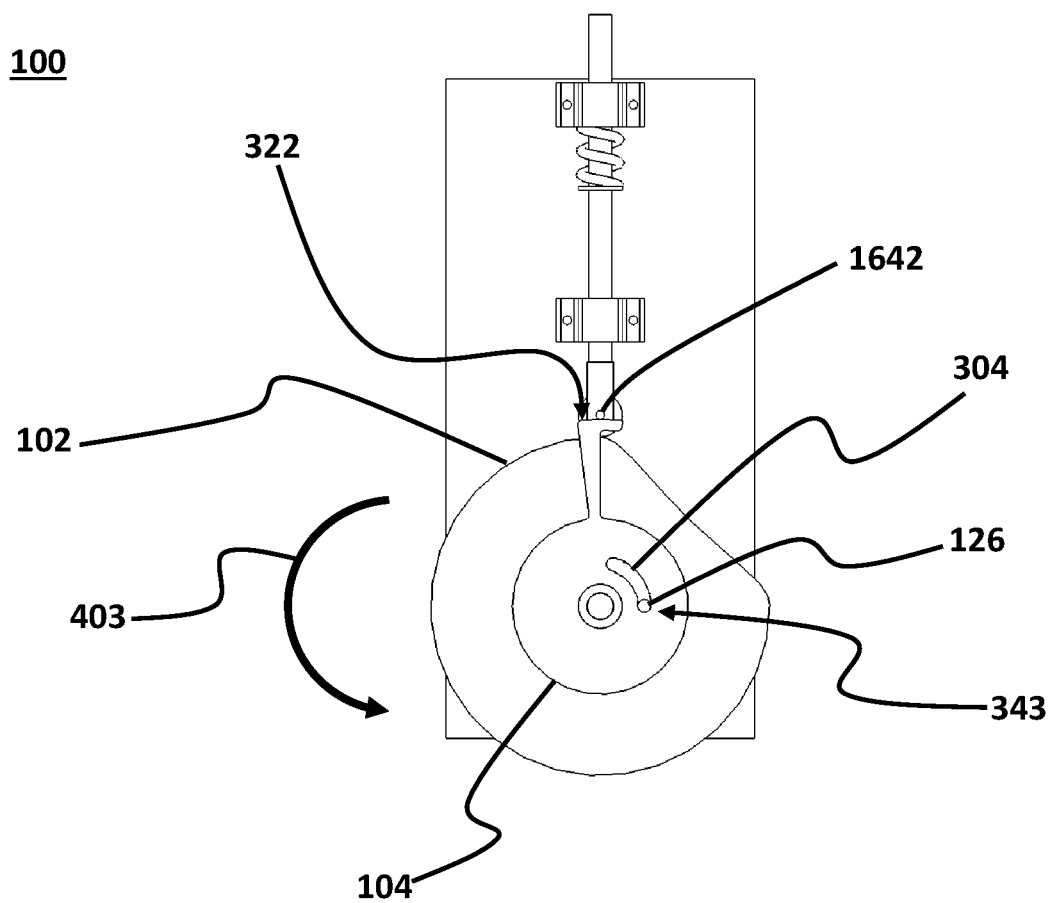
FIG. 4D illustrates a unidirectional spring assembly in a scenario in which a rotating rod and a reduced disc are at a third angular position, consistent with one or more exemplary embodiments of the present disclosure.
Figure 4E:
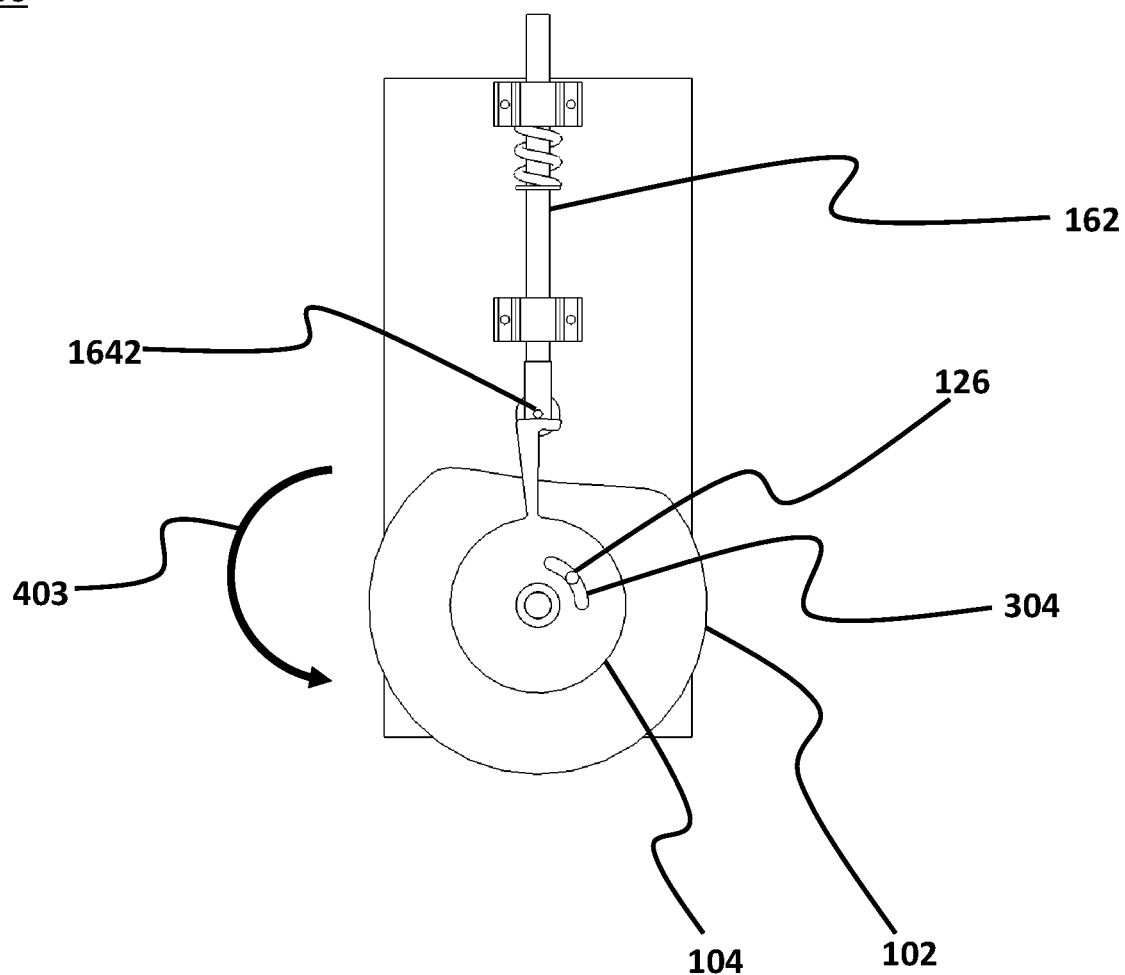
FIG. 4E illustrates a unidirectional spring assembly in a scenario in which a rotating rod and a reduced disc are moving from a third angular position to a fourth angular position, consistent with one or more exemplary embodiments of the present disclosure.
Figure 4F:
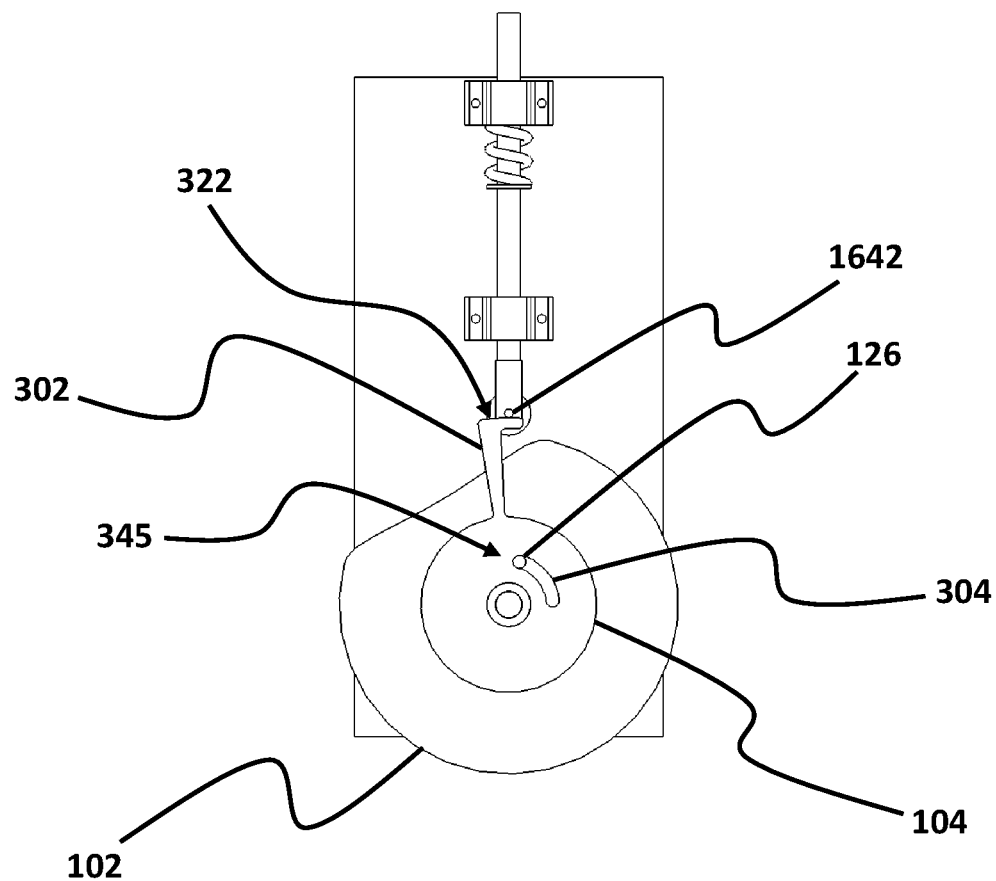
FIG. 4F illustrates a unidirectional spring assembly in a scenario in which a rotating rod and a reduced disc are at a fourth angular position, consistent with one or more exemplary embodiments of the present disclosure.

FIG. 4A shows unidirectional spring assembly 100 in a scenario in which rotating rod 150 and reduced disc 102 are at a first angular position, consistent with one or more exemplary embodiments of the present disclosure. FIG. 4B shows unidirectional spring assembly 100 in a scenario in which rotating rod 150 and reduced disc 102 are moving from the first angular position to a second angular position, consistent with one or more exemplary embodiments of the present disclosure. FIG. 4C shows unidirectional spring assembly 100 in a scenario in which rotating rod 150 and reduced disc 102 are at the second angular position, consistent with one or more exemplary embodiments of the present disclosure. FIG. 4D shows unidirectional spring assembly 100 in a scenario in which rotating rod 150 and reduced disc 102 are at a third angular position, consistent with one or more exemplary embodiments of the present disclosure. FIG. 4E shows unidirectional spring assembly 100 in a scenario in which rotating rod 150 and reduced disc 102 are moving from the third angular position to a fourth angular position, consistent with one or more exemplary embodiments of the present disclosure. FIG. 4F shows unidirectional spring assembly 100 in a scenario in which rotating rod 150 and reduced disc 102 are at the fourth angular position, consistent with one or more exemplary embodiments of the present disclosure. In an exemplary embodiment, when rotating rod 150 rotates around first axis 152 and in a first rotational direction 402 between the first angular position (shown in FIG. 4A) and the second angular position (shown in FIG. 4C), reduced disc 102 may rotate synchronously with rotating rod 150 and roller 164 may move on concave surface 122 between a first end 404 of concave surface 122 and a second end 406 of concave surface 122. In an exemplary embodiment, it may be understood that when roller 164 moves on concave surface 122 between first end 404 of concave surface 122 and second end 406 of concave surface 122, guide rod 150 may move up and/or down along second axis 163, and thereby, a length of spring 166 may change. In an exemplary embodiment, when guide rod 150 moves upward along second axis 163, a length of spring 166 may decrease and when guide rod 150 moves downward along second axis 163, a length of spring 166 may increase. In an exemplary embodiment, smaller length of spring 166 may indicate that spring 166 is more compressed and, consequently, more energy may be stored in spring 166. In an exemplary embodiment, it may be understood that when more energy is stored in spring 166, more downward spring force may be applied to guide rod 150 from spring 166.

In an exemplary embodiment, when rotating rod 150 rotates around first axis 152 and in first rotational direction 402 between the second angular position (shown in FIG. 4C) and the third angular position (shown in FIG. 4D), reduced disc 102 may rotate synchronously with rotating rod 150 between the second angular position and the third angular position. Furthermore, as shown in FIG. 4C and FIG. 4D, in an exemplary embodiment, when reduced disc 102 rotates around first axis 152 and in first rotational direction 402 between the second angular position and the third angular position, push pin 126 may push a first end 343 of circular slot 304, and thereby, rotary clutch member 104 may rotate synchronously with reduced disk 102, and thereby, guide rod 150 may move on a top surface 322 of clutch arm 302.

Referring back to FIG. 1A and FIG. 1B, in an exemplary embodiment, a first pin 1642 may be attached to guide rod 162. In an exemplary embodiment, when reduced disc 102 rotates around first axis 152 and in first rotational direction 402 between the second angular position and the third angular position, push pin 126 may push first end 343 of circular slot 304, and thereby, rotary clutch member 104 may rotate synchronously with reduced disk 102, and thereby, first pin 1642 may move on top surface 322 of clutch arm 302. In an exemplary embodiment, it may be understood that when first pin 1642 is present on top surface 322 of clutch arm 302, guide rod 162 may not be able to move downward along second axis 163.

In an exemplary embodiment, when rotating rod 150 rotates around first axis 152 and in a second rotational direction 403 between the third angular position (shown in FIG. 4D) and the fourth angular position (shown in FIG. 4F), reduced disc 102 may rotate synchronously with rotating rod 150 between the third angular position (shown in FIG. 4D) and the fourth angular position (shown in FIG. 4F). In an exemplary embodiment, when rotating rod 150 rotates around first axis 152 and in second rotational direction 403 between the third angular position (shown in FIG. 4D) and the fourth angular position (shown in FIG. 4F), first pin 1642 may stand on top surface 322 of clutch arm 302. In an exemplary embodiment, it may be understood that when first pin 1642 stands on top surface 322 of clutch arm 302, guide rod 162 may be prevented from moving along second axis 163. Consequently, it may be understood that, in an exemplary embodiment, when rotating rod 150 rotates around first axis 152 and in second rotational direction 403 between the third angular position (shown in FIG. 4D) and the fourth angular position (shown in FIG. 4F), guide rod 162 may be prevented from moving along second axis 163.

In an exemplary embodiment, when rotating rod 150 rotates around first axis 152 and in second rotational direction 403 between the fourth angular position (shown in FIG. 4F) and the first angular position (shown in FIG. 4A), reduced disc 102 may rotate synchronously with rotating rod 150 between the fourth angular position (shown in FIG. 4F) and the first angular position (shown in FIG. 4A). Furthermore, in an exemplary embodiment, when rotating rod 150 rotates around first axis 152 and in second rotational direction 403 between the fourth angular position (shown in FIG. 4F) and the first angular position (shown in FIG. 4A), pin 126 may push a second end 345 of circular slot 304, and thereby, rotary clutch member 104 may rotate synchronously with reduced disc 102, and thereby, first pin 164 may move on top surface 322 of clutch arm 302, and roller 164 may move on outer periphery 124 of reduced disc 102.

Figure 5A:
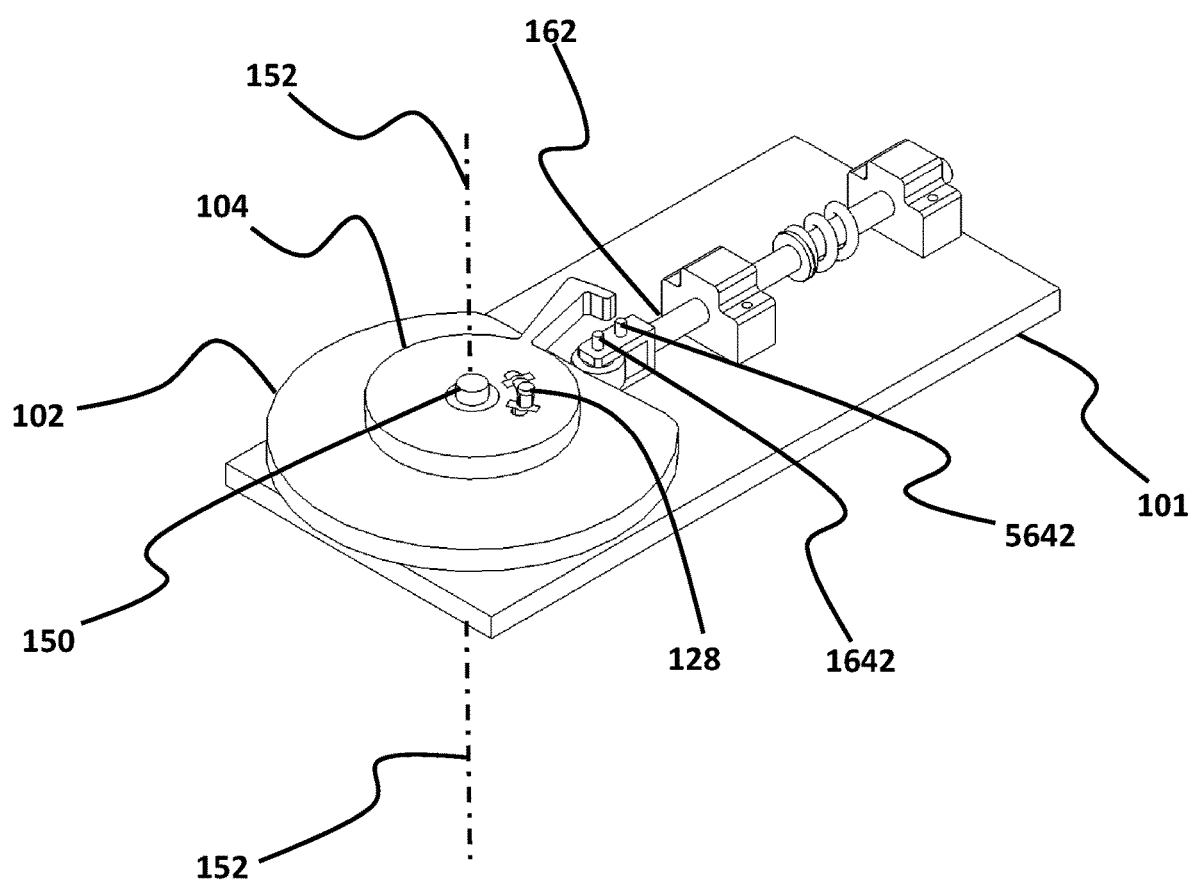
FIG. 5A illustrates a perspective view of a unidirectional spring assembly, consistent with one or more exemplary embodiments of the present disclosure.
Figure 5B:
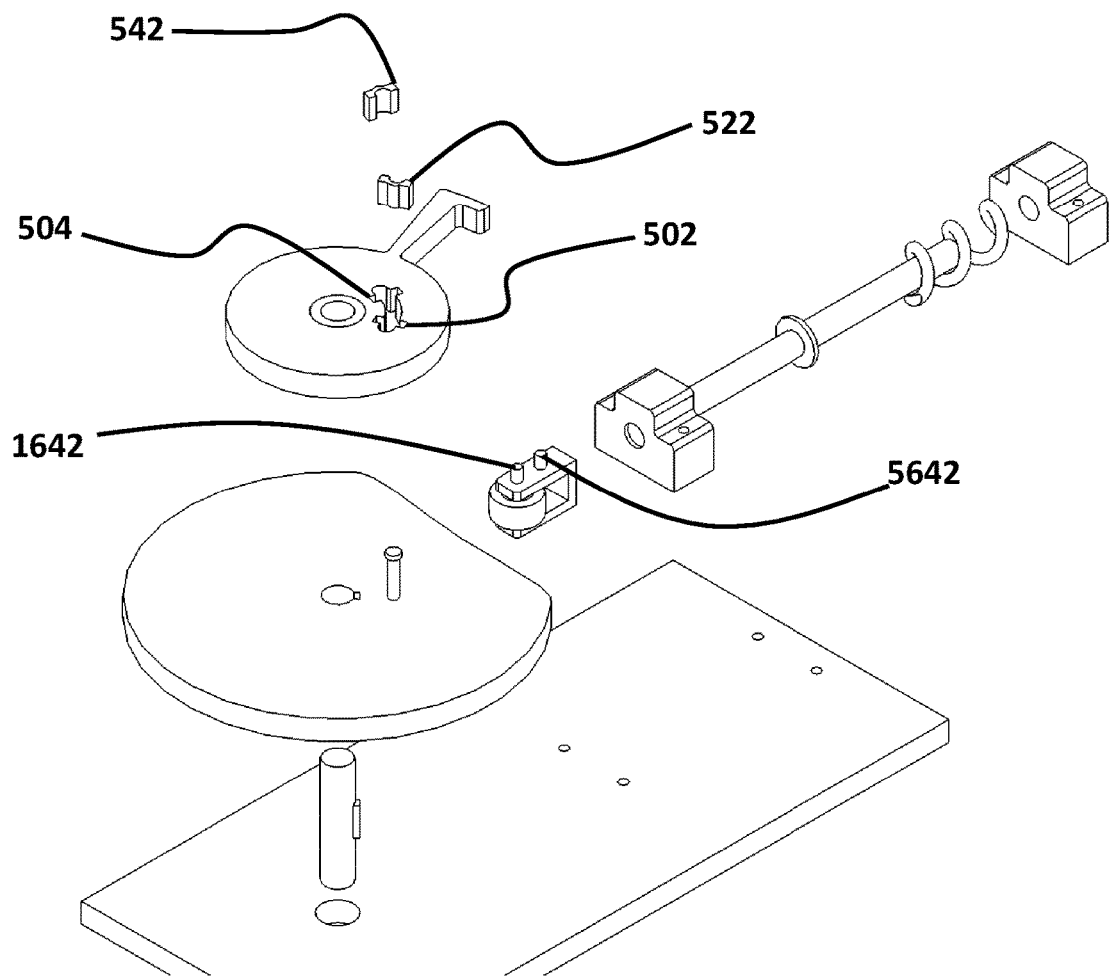
FIG. 5B illustrates an exploded view of a unidirectional spring assembly, consistent with one or more exemplary embodiments of the present disclosure.
Figure 5C:
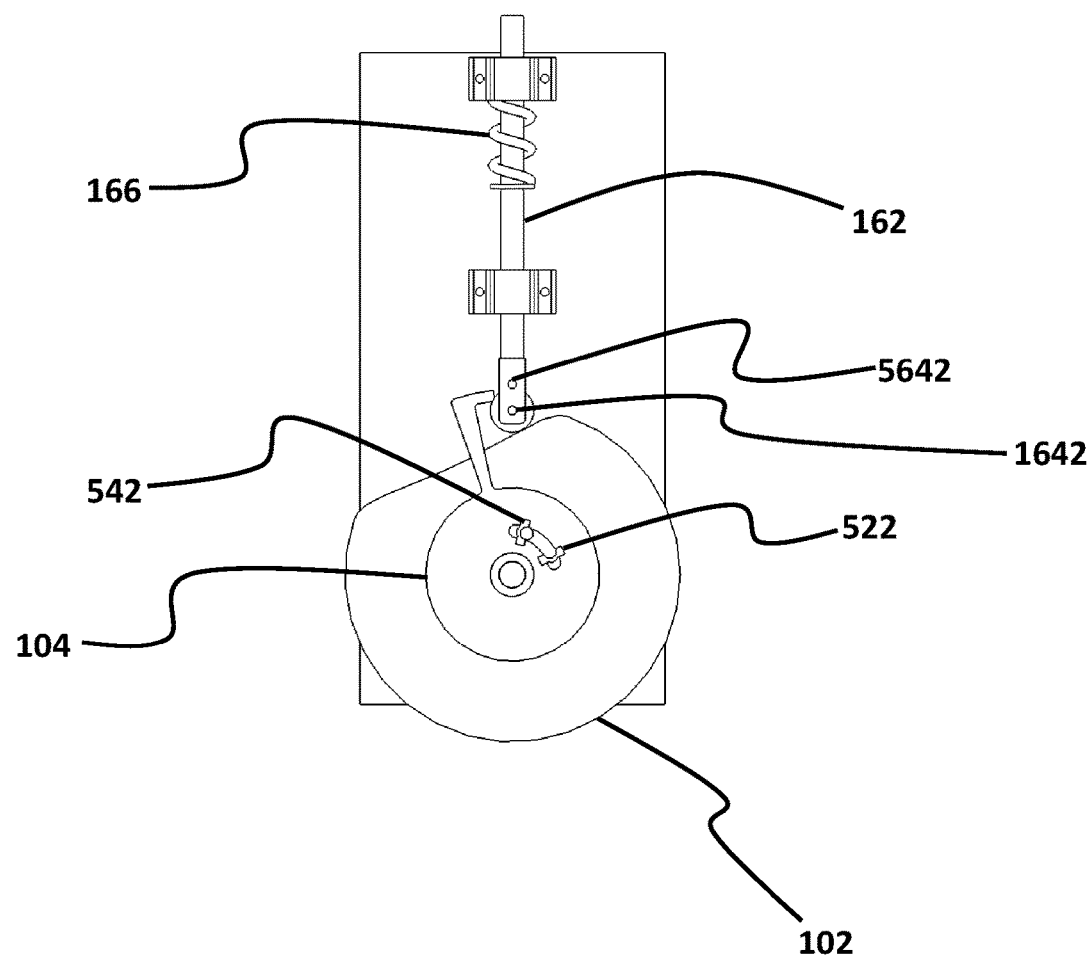
FIG. 5C illustrates a side view of a unidirectional spring assembly, consistent with one or more exemplary embodiments of the present disclosure.

FIG. 5A shows a perspective view of unidirectional spring assembly 100, consistent with one or more exemplary embodiments of the present disclosure. FIG. 5B shows an exploded view of unidirectional spring assembly 100, consistent with one or more exemplary embodiments of the present disclosure. FIG. 5C shows a side view of unidirectional spring assembly 100, consistent with one or more exemplary embodiments of the present disclosure. As shown in FIG. 5A, FIG. 5B, and FIG. 5C, in an exemplary embodiment, rotary clutch member 104 may further include a first sub-slot 502. In an exemplary embodiment, first sub-slot 502 may intersect circular slot 304. In an exemplary embodiment, first sub-slot 502 may be configured to receive a first nut 522. In an exemplary embodiment, a size of first nut 522 may correspond to a size of first sub-slot 502 and also a shape of first nut 522 may correspond to a shape of first sub-slot 502. In an exemplary embodiment, when first nut 522 is inserted into first sub-slot 502, first nut 522 may be engaged and coupled with rotary clutch member 104. In an exemplary embodiment, when first nut 522 is engaged and coupled with rotary clutch member 104, first nut 522 and rotary clutch member 104 may act as an integrated part. For example, when first nut 522 is coupled with rotary clutch member 104, during rotation of rotary clutch member 104 around first axis 152, first nut 522 may rotate synchronously with rotary clutch member 104 around first axis 152.

In an exemplary embodiment, rotary clutch member 104 may further include a second sub-slot 504. In an exemplary embodiment, second sub-slot 504 may intersect circular slot 304. In an exemplary embodiment, second sub-slot 504 may be configured to receive a second nut 542. In an exemplary embodiment, a size of second nut 542 may correspond to a size of second sub-slot 504 and also a shape of second nut 542 may correspond to a shape of second sub-slot 504. In an exemplary embodiment, when second nut 542 is inserted into second sub-slot 504, second nut 542 may be coupled with rotary clutch member 104. In an exemplary embodiment, when second nut 542 is coupled with rotary clutch member 104, second nut 522 and rotary clutch member 104 may act as an integrated part. For example, when second nut 522 is coupled with rotary clutch member 104, during rotation of rotary clutch member 104 around first axis 152, second nut 542 may rotate synchronously with rotary clutch member 104 around first axis 152.

Figure 6A:
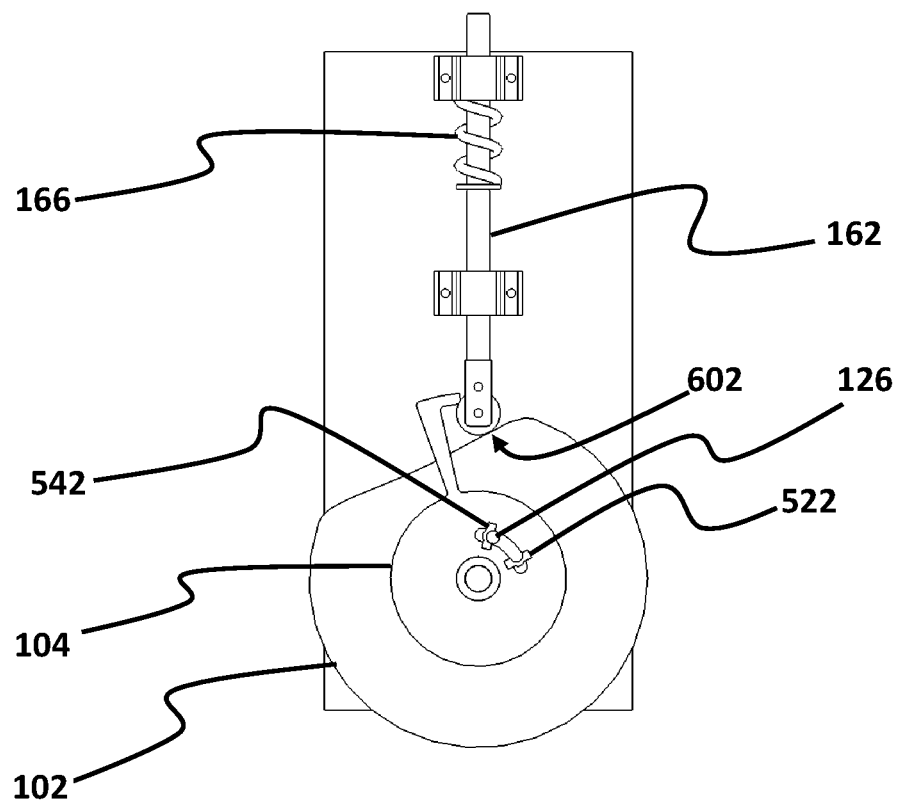
FIG. 6A illustrates a unidirectional spring assembly in a scenario in which a rotating rod and a reduced disc are at a fifth angular position, consistent with one or more exemplary embodiments of the present disclosure.
Figure 6B:
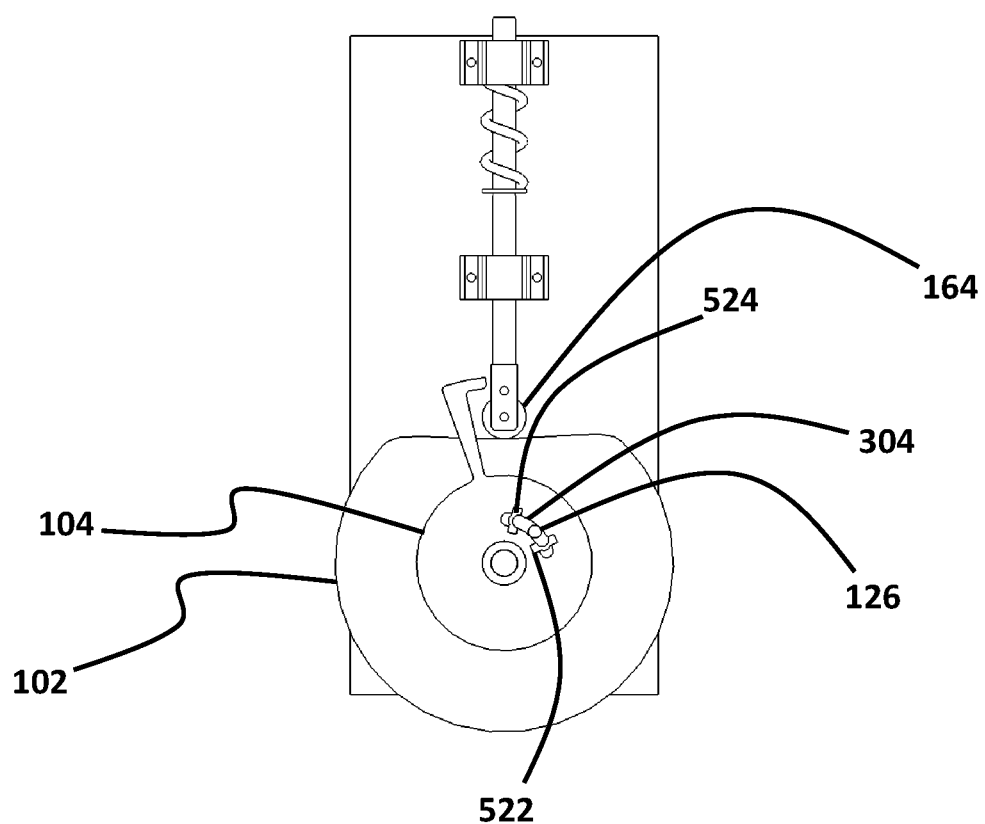
FIG. 6B illustrates a unidirectional spring assembly in a scenario in which a rotating rod and a reduced disc are moving from a fifth angular position to a sixth angular position, consistent with one or more exemplary embodiments of the present disclosure.
Figure 6C:
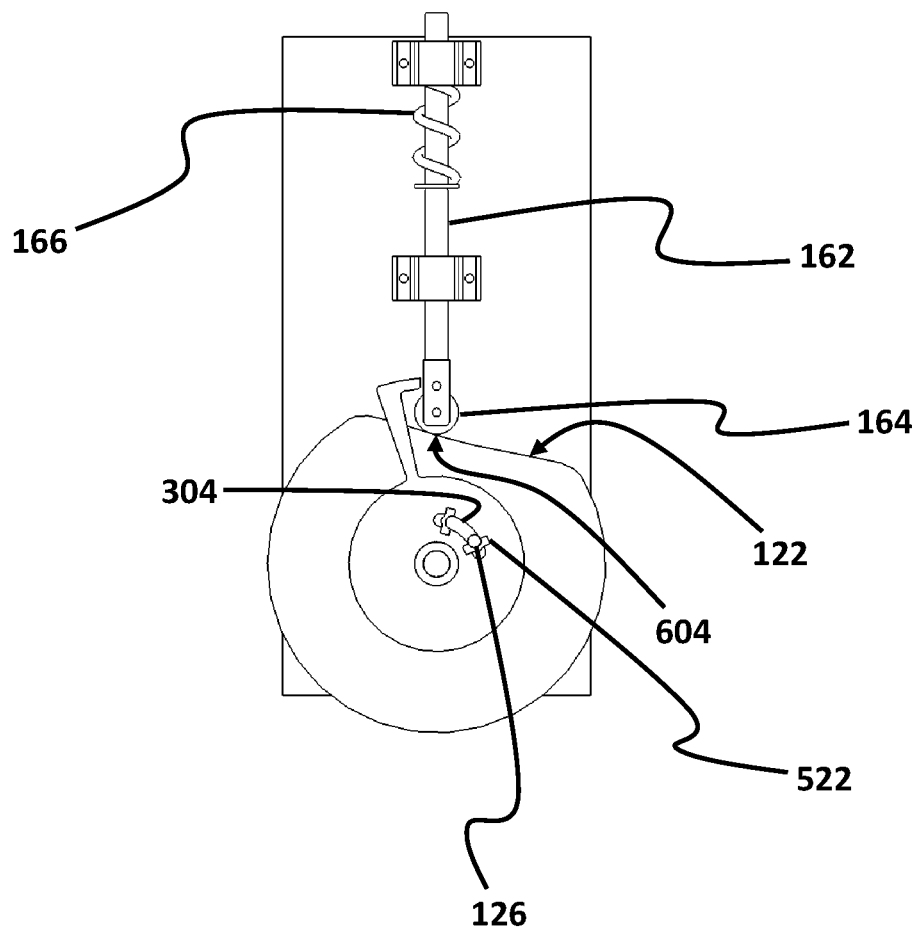
FIG. 6C illustrates a unidirectional spring assembly in a scenario in which a rotating rod and a reduced disc are at a sixth angular position, consistent with one or more exemplary embodiments of the present disclosure.
Figure 6D:
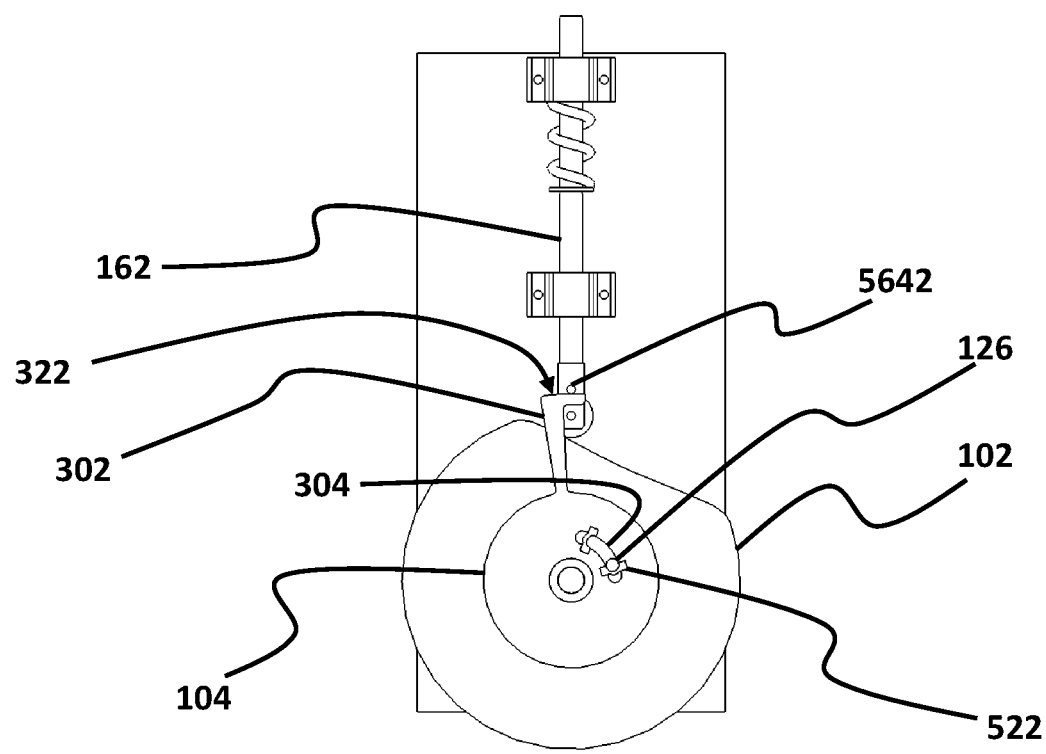
FIG. 6D illustrates a unidirectional spring assembly in a scenario in which a rotating rod and a reduced disc are at a seventh angular position, consistent with one or more exemplary embodiments of the present disclosure.
Figure 6E:
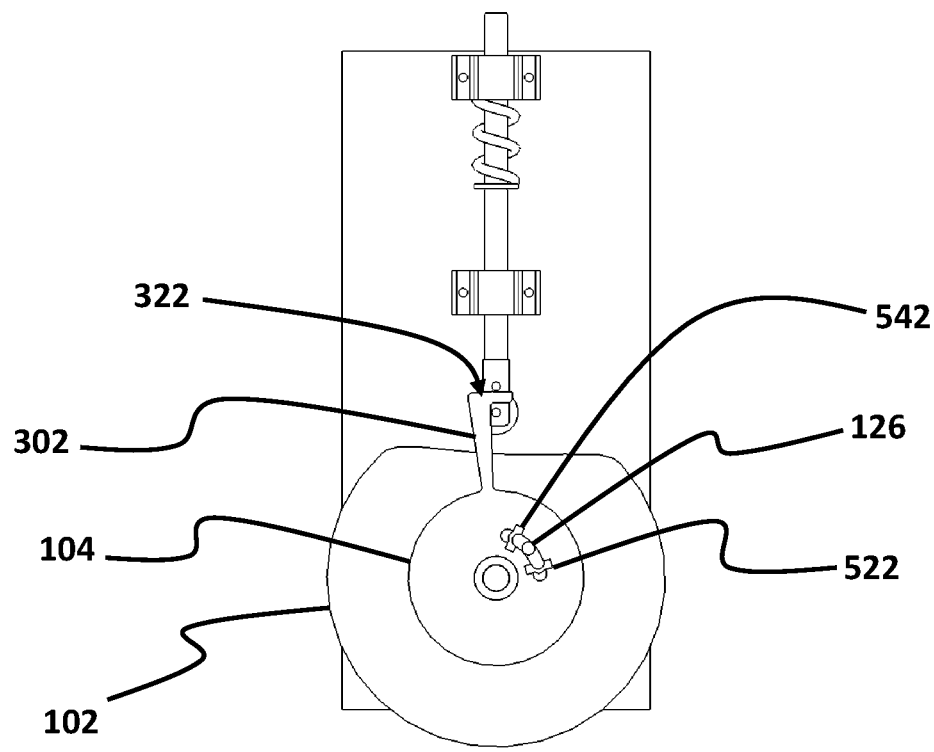
FIG. 6E illustrates a unidirectional spring assembly in a scenario in which a rotating rod and a reduced disc are moving from a seventh angular position to an eighth angular position, consistent with one or more exemplary embodiments of the present disclosure.
Figure 6F:
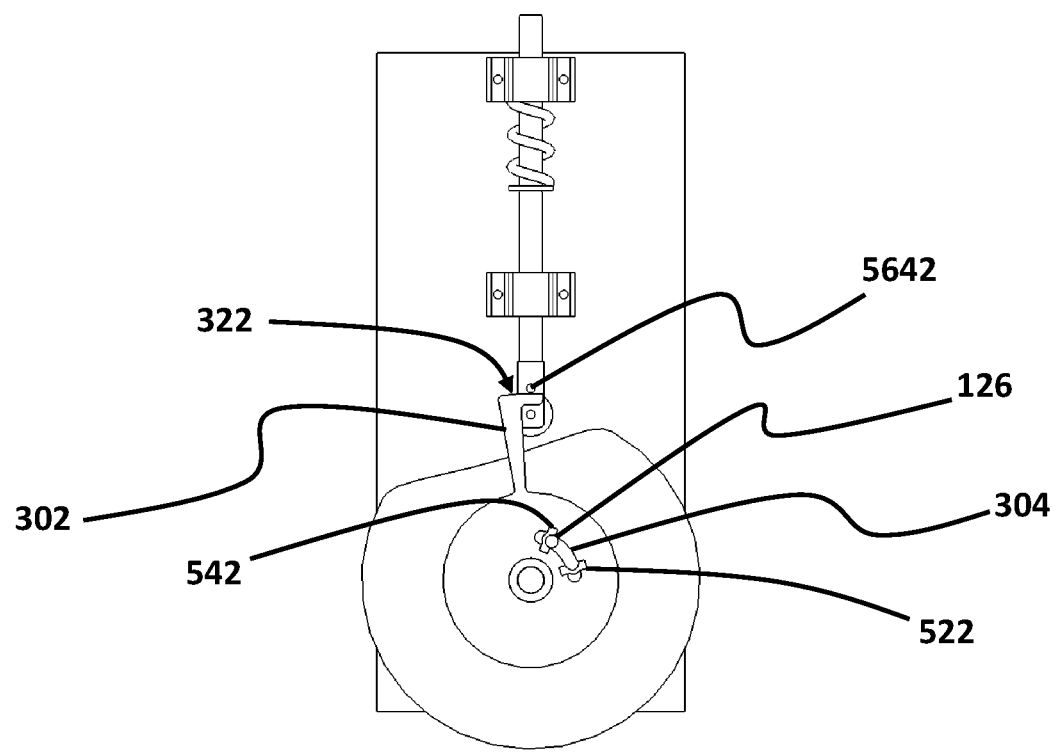
FIG. 6F illustrates a unidirectional spring assembly in a scenario in which a rotating rod and a reduced disc are at an eighth angular position, consistent with one or more exemplary embodiments of the present disclosure.

FIG. 6A shows unidirectional spring assembly 100 in a scenario in which rotating rod 150 and reduced disc 102 are at a fifth angular position, consistent with one or more exemplary embodiments of the present disclosure. FIG. 6B shows unidirectional spring assembly 100 in a scenario in which rotating rod 150 and reduced disc 102 are moving from the fifth angular position to a sixth angular position, consistent with one or more exemplary embodiments of the present disclosure. FIG. 6C shows unidirectional spring assembly 100 in a scenario in which rotating rod 150 and reduced disc 102 are at the sixth angular position, consistent with one or more exemplary embodiments of the present disclosure. FIG. 6D shows unidirectional spring assembly 100 in a scenario in which rotating rod 150 and reduced disc 102 are at a seventh angular position, consistent with one or more exemplary embodiments of the present disclosure. FIG. 6E shows unidirectional spring assembly 100 in a scenario in which rotating rod 150 and reduced disc 102 are moving from the seventh angular position to an eighth angular position, consistent with one or more exemplary embodiments of the present disclosure. FIG. 6F shows unidirectional spring assembly 100 in a scenario in which rotating rod 150 and reduced disc 102 are at the eighth angular position, consistent with one or more exemplary embodiments of the present disclosure.

In an exemplary embodiment, when rotating rod 150 rotates around first axis 152 and in first rotational direction 402 between the fifth angular position (shown in FIG. 6A) and the sixth angular position (shown in FIG. 6C), reduced disc 102 may rotate synchronously with rotating rod 150 and roller 164 may move on concave surface 122 between a first place 602 on concave surface 122 and a second place 604 on concave surface 122. In an exemplary embodiment, it may be understood that when roller 164 moves on concave surface 122 between first place 602 on concave surface 122 and second place 604 on concave surface 122, guide rod 150 may move back and forth along second axis 163, and thereby, a length of spring 166 may change. In an exemplary embodiment, when guide rod 150 moves upward along second axis 163, a length of spring 166 may decrease and when guide rod 150 moves downward along second axis 163, a length of spring 166 may increase. In an exemplary embodiment, smaller length of spring 166 may indicate that spring 166 is more compressed and, consequently, more energy may be stored in spring 166. In an exemplary embodiment, it may be understood that when more energy is stored in spring, more downward spring force may be applied to guide rod 150 from spring 166.

In an exemplary embodiment, when rotating rod 150 rotates around first axis 152 and in first rotational direction 402 between the sixth angular position (shown in FIG. 6C) and the seventh angular position (shown in FIG. 6D), reduced disc 102 may rotate synchronously with rotating rod 150 between the sixth angular position and the seventh angular position. Furthermore, as shown in FIG. 6C and FIG. 6D, in an exemplary embodiment, when reduced disc 102 rotates around first axis 152 and in first rotational direction 402 between the sixth angular position and the seventh angular position, pin 126 may push first nut 522, and thereby, rotary clutch member 104 may rotate synchronously with reduced disk 102, and thereby, roller 164 may move on top surface 322 of clutch arm 302.

Referring back to FIG. 5A and FIG. 5B, in an exemplary embodiment, a second pin 5642 may be attached to guide rod 162. In an exemplary embodiment, when reduced disc 102 rotates around first axis 152 and in first rotational direction 402 between the sixth angular position (shown in FIG. 6C) and the seventh angular position (shown in FIG. 6D), pin 126 may push first end 522, and thereby, rotary clutch member 104 may rotate synchronously with reduced disk 102, and thereby, second pin 5642 may move on top surface 322 of clutch arm 302. In an exemplary embodiment, it may be understood that when second pin 5642 is present on top surface 322 of clutch arm 302, guide rod 162 may not be able to move downward along second axis 163.

In an exemplary embodiment, when rotating rod 150 rotates around first axis 152 and in second rotational direction 403 between the seventh angular position (shown in FIG. 6D) and the eighth angular position (shown in FIG. 6F), reduced disc 102 may rotate synchronously with rotating rod 150 between the seventh angular position (shown in FIG. 6D) and the eighth angular position (shown in FIG. 6F). In an exemplary embodiment, when rotating rod 150 rotates around first axis 152 and in second rotational direction 403 between the seventh angular position (shown in FIG. 6D) and the eighth angular position (shown in FIG. 6F), second pin 5642 may stand on top surface 322 of clutch arm 302. In an exemplary embodiment, it may be understood that when second pin 5642 stands on top surface 322 of clutch arm 302, guide rod 162 may be prevented from moving along second axis 163. Consequently, it may be understood that, in an exemplary embodiment, when rotating rod 150 rotates around first axis 152 and in second rotational direction 403 between the seventh angular position (shown in FIG. 4D) and the eighth angular position (shown in FIG. 4F), guide rod 162 may be prevented from moving along second axis 163.

In an exemplary embodiment, when rotating rod 150 rotates around first axis 152 and in second rotational direction 403 between the eighth angular position (shown in FIG. 6D) and the fifth angular position (shown in FIG. 6A), reduced disc 102 may rotate synchronously with rotating rod 150 between the eighth angular position (shown in FIG. 6D) and the fifth angular position (shown in FIG. 6A). Furthermore, in an exemplary embodiment, when rotating rod 150 rotates around first axis 152 and in second rotational direction 403 between the eighth angular position (shown in FIG. 6D) and the fifth angular position (shown in FIG. 6A), pin 126 may push second nut 542, and thereby, rotary clutch member 104 may rotate synchronously with reduced disc 102, and thereby, second pin 5642 may move on top surface 322 of clutch arm 302, and roller 164 may move on outer periphery 124 of reduced disc 102.

Figure 7A:
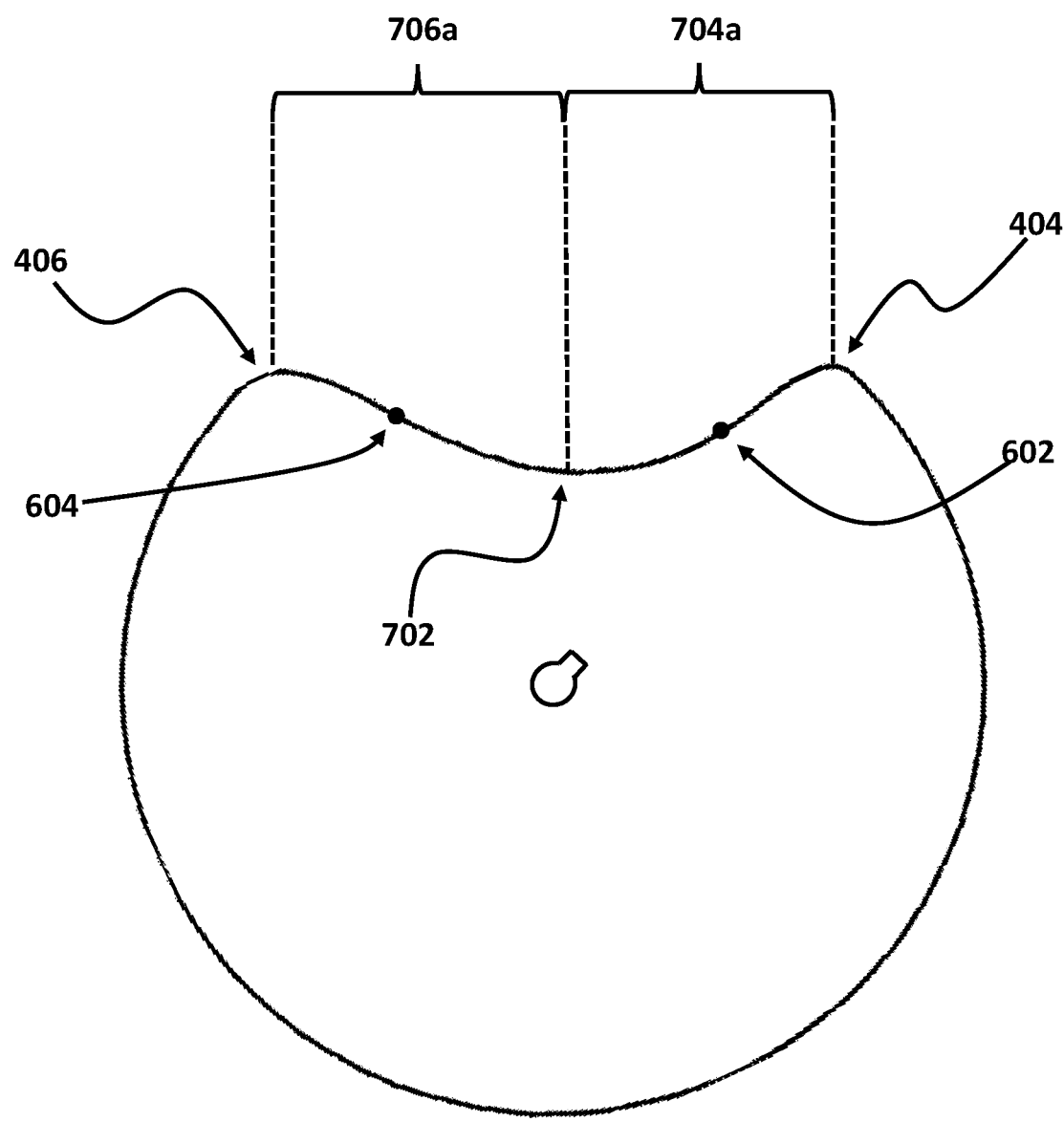
FIG. 7A illustrates a side view of a reduced disc, consistent with one or more exemplary embodiments of the present disclosure.

FIG. 7A shows a side view of reduced disc 102, consistent with one or more exemplary embodiments of the present disclosure. As shown in FIG. 7A, in an exemplary embodiment, concave surface 122 may include a first right segment 704a and a first left segment 706a. In an exemplary embodiment, first right segment 704a may refer to a segment of concave surface 122 which is between first end 404 of concave surface 122 and a bottom point 702 of concave surface 122. In an exemplary embodiment, first left segment 706a may refer to a segment of concave surface 122 which is between second end 406 of concave surface 122 and bottom point 702 of concave surface 122. In an exemplary embodiment, it may be understood that by utilizing first nut 522, first right segment 704a and may be substituted by a second right segment (not shown in FIG. 7A) which may be smaller in size than first right segment 704a. In an exemplary embodiment, when first nut 522 is inserted into first sub-slot 502, the second right segment may refer to a segment of concave surface 122 which is between first place 602 of concave surface 122 and bottom point 702 of concave surface 122. In an exemplary embodiment, it may be understood that by utilizing second nut 542, first left segment 706a may be substituted by a second left segment (not shown in FIG. 7B) which may be smaller in size than first left segment 706a. In an exemplary embodiment, when second nut 542 is inserted into second sub-slot 504, the second left segment may refer to a segment of concave surface 122 which is between second point 604 of concave surface 122 and bottom point 702 of concave surface 122.

Figure 7B:
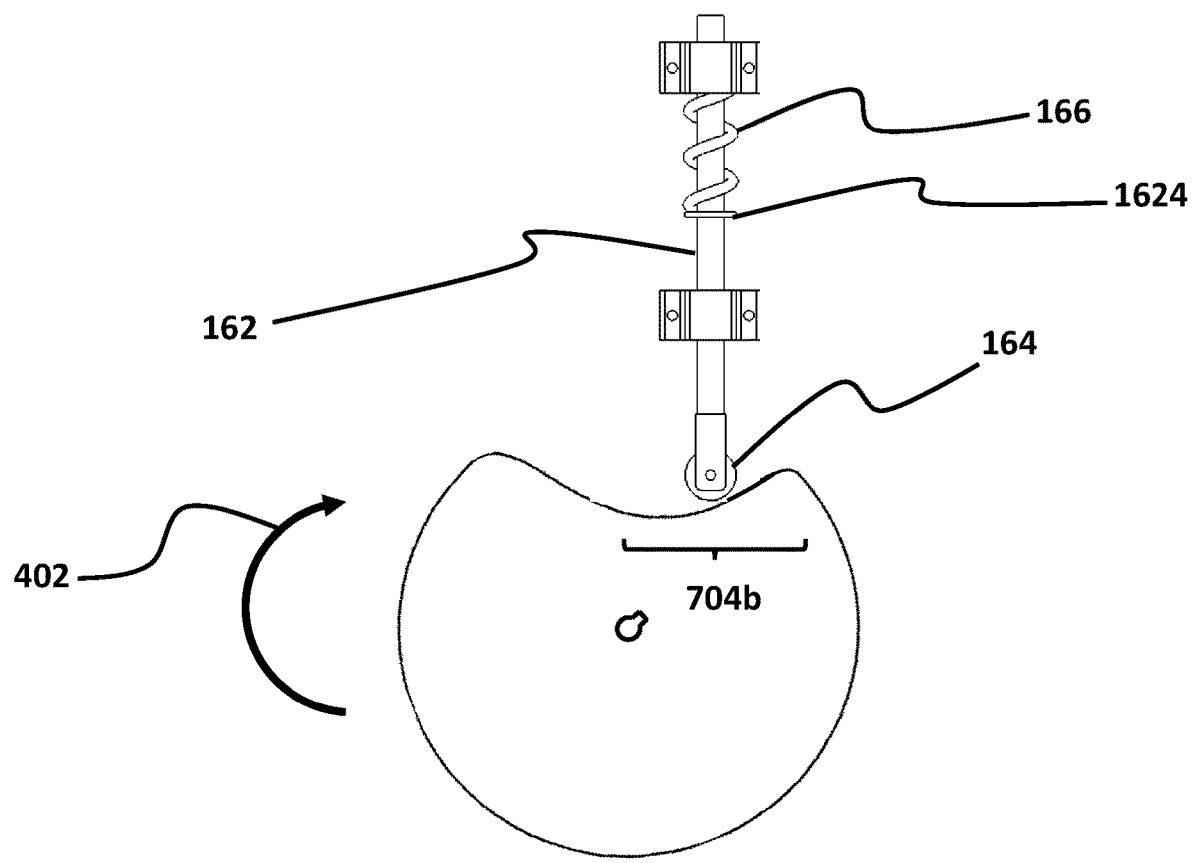
FIG. 7B illustrates a side view of a unidirectional spring assembly in a scenario in which a roller is moving on a right segment of a concave surface, consistent with one or more exemplary embodiments of the present disclosure.
Figure 7C:
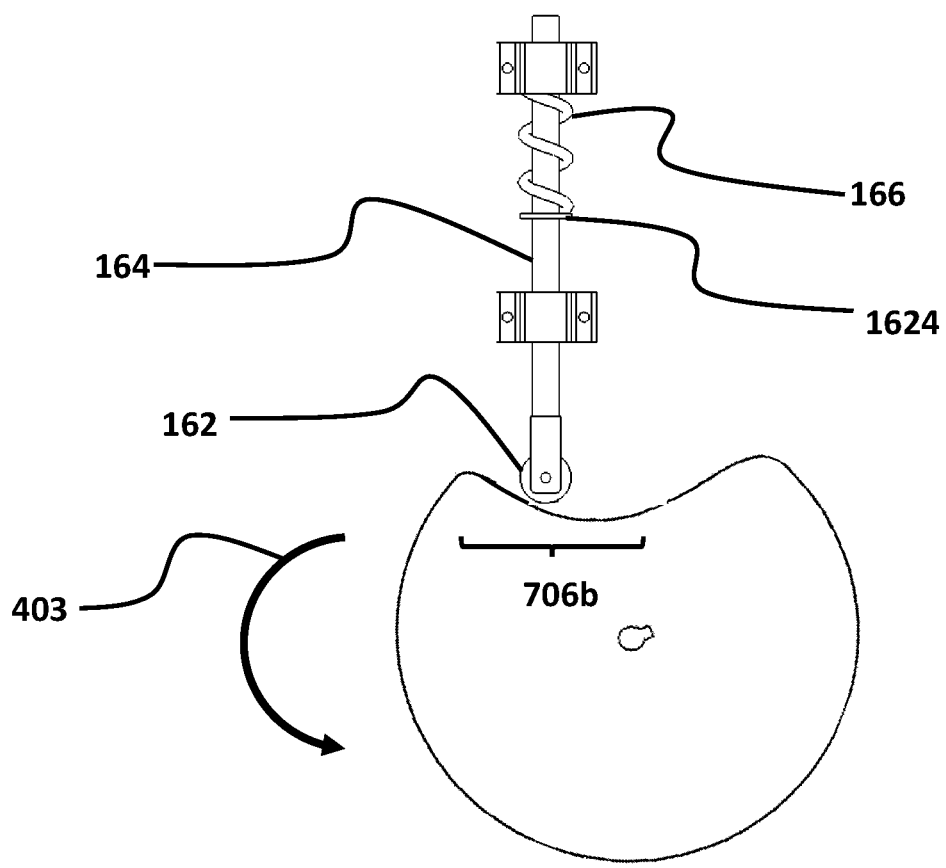
FIG. 7C illustrates a side view of a unidirectional spring assembly in a scenario in which a roller is moving on a left segment of a concave surface, consistent with one or more exemplary embodiments of the present disclosure.

FIG. 7B shows a side view of unidirectional spring assembly 100 in a scenario in which roller 164 is moving on right segment 704b of concave surface 122 which may be one of first right segment 704a or the second right segment, consistent with one or more exemplary embodiments of the present disclosure. As shown in FIG. 7B, in an exemplary embodiment, when roller 164 is moving on right segment 704b of concave surface 122, spring 166 may push guide rod 162 downward through pushing lip 1624 downwardly. In an exemplary embodiment, it may be understood that when roller 164 is moving on right segment 704b of concave surface 122, spring 166 may urge reduced disc 102 and rotating rod 150 to rotate around first axis 152 and in first rotational direction 402. FIG. 7C shows a side view of unidirectional spring assembly 100 in a scenario in which roller 164 is moving on left segment 706b which may be one of first left segment 706a or the second left segment of concave surface 122, consistent with one or more exemplary embodiments of the present disclosure. As shown in FIG. 7C, in an exemplary embodiment, when roller 164 is moving on left segment 706b of concave surface 122, spring 166 may push guide rod 162 downward through pushing lip 1624 downwardly. In an exemplary embodiment, it may be understood that when roller 164 is moving on left segment 706b of concave surface 122, spring 166 may urge reduced disc 102 and rotating rod 150 to rotate around first axis 152 and in second rotational direction 403.

According to embodiments disclosed herein, it may be understood that unidirectional spring assembly 100 may be coupled to an exemplary rotating rod such as rotating rod 150. As described above, when rotating rod 150 is coupled to unidirectional spring assembly 100 and rotating rod 150 is rotating around first axis 163 and in first rotational direction 402, spring 166 may apply a downward force to concave surface 122 of reduced disc 102, and to thereby, apply a torque in first rotational direction 402 to rotating rod 150. In an exemplary embodiment, when roller 164 is moving on right segment 704b of concave surface 122, spring 166 may release spring's 166 potential energy and convert it to a torque being applied to reduced disc 102 and rotating rod 150 in first rotational direction. In an exemplary embodiment, when roller 164 is moving on left segment 706b of concave surface 122, reduced disc 102 push guide rod 162 upward and, to thereby, compress spring 166. In an exemplary embodiment, when spring 166 is compressed, a potential energy may be stored in spring 166. In the other hand, in an exemplary embodiment, during rotation of rotating rod 150 in second rotational direction 403, roller 164 may be prevented from being in contact with reduced disc 102 due to the fact that guide rod 162 is present on top surface 322 of clutch arm 302. Consequently, during rotation of rotating rod 150 in second rotational direction 403, spring 166 may have no effect on rotation of rotating rod 150. Hence, in an exemplary embodiment, unidirectional spring assembly 100 may act as a unidirectional rotational spring for rotating rod 150.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective spaces of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A non-linear spring assembly for a rotating rod, comprising:
    a reduced disc mounted fixedly onto the rotating rod, the reduced disc configured to rotate synchronously with the rotating rod around a first axis responsive to rotation of the rotating rod around the first axis, the reduced disc comprising:
        a concave surface on an outer periphery of the reduced disc; and
        a push pin attached to a side surface of the reduced disc;
    a rotary clutch member mounted onto the rotating rod, and immediately next to the reduced disc, where the rotary clutch member is mounted onto the rotating rod in a manner that the rotary clutch member is constantly in contact with the rotating rod but not rotating synchronously with the rotating rod, the rotary clutch member configured to rotate around the first axis, the rotary clutch member comprising:
        a clutch arm; and
        a circular slot on a side surface of the rotary clutch member, the push pin disposed slidably inside the circular slot; and
    a spring assembly, comprising:
        a guide rod configured to move along a second axis;
        a roller attached to a distal end of the guide rod, the roller configured to move on the outer periphery of the reduced disc; and
        a spring coupled to the guide rod, the spring configured to urge the guide rod to move along the second axis and in a first direction,
    wherein:
        responsive to rotation of the rotating rod around the first axis and in a first rotational direction between a first angular position and a second angular position:
            the reduced disc rotates synchronously with the rotating rod between the first angular position and the second angular position;
            and the guide rod moves up and down along the second axis due to the roller moving on the concave surface between a first end of the concave surface and a second end of the concave surface, the first angular position associated with the first end of the concave surface;
        responsive to rotation of the rotating rod around the first axis and in the first rotational direction between the second angular position and a third angular position:
            the reduced disc rotates synchronously with the rotating rod between the second angular position and the third angular position, the third angular position associated with the second end of the concave surface;

and the guide rod moves on a top surface of the clutch arm due to the push pin pushing a first end of the circular slot and the rotary clutch member rotating synchronously with the reduced disc;

responsive to rotation of the rotating rod around the first axis and in a second rotational direction between the third angular position and a fourth angular position:

the reduced disc rotates synchronously with the rotating rod between the third angular position and the fourth angular position;

and the guide rod is prevented from moving along the second axis due to the guide rod standing on the top surface of the clutch arm; and responsive to rotation of the rotating rod around the first axis and in the second rotational direction between the fourth angular position and the first angular position:

the reduced disc rotates synchronously with the rotating rod between the fourth angular position and the first angular position; and the guide rod moves on the top surface of the clutch arm and the roller moves on the outer periphery of the reduced disc due to the rotary clutch member rotating synchronously with the reduced disc due to the push pin pushing a second end of the circular slot.

2. The unidirectional spring assembly of claim 1, wherein the rotary clutch member further comprises:

a first sub-slot intersecting the circular slot, the first sub-slot configured to receive a first nut, the first nut configured to be coupled with the rotary clutch member when the first nut is present in the first sub-slot, responsive to rotation of the reduced disc around the first axis and in the first rotational direction between a sixth angular position and a seventh angular position, the rotary clutch member rotates synchronously with the reduced disc due to the push pin pushes the first nut; and a second sub-slot intersecting the circular slot, the second sub-slot configured to receive a second nut, the second nut configured to be coupled with the rotary clutch member when the second nut is present in the second sub-slot, responsive to rotation of the reduced disc around the first axis and in the second rotational direction between an eighth angular position and a fifth angular position, the rotary clutch member rotates synchronously with the reduced disc due to the push pin pushes the second nut.

3. The unidirectional spring assembly of claim 2, wherein the first axis comprises a main longitudinal axis of the rotating rod.

4. The unidirectional spring assembly of claim 3, wherein the second axis comprises a main longitudinal axis of the guide rod.

5. The unidirectional spring assembly of claim 4, wherein the first axis is perpendicular to the second axis.

6. The unidirectional spring assembly of claim 5, responsive to rotation of the rotating rod around the first axis and in the second rotational direction between the third angular position and the fourth angular position:

the reduced disc rotates synchronously with the rotating rod between the third angular position and the fourth angular position; and the guide rod is prevented from moving along the second axis due to a first pin of the guide rod stands on the top surface of the clutch arm, wherein the first pin is attached to a bottom end of the guide rod.

7. The unidirectional spring assembly of claim 6, responsive to rotation of the rotating rod around the first axis and in the second rotational direction between the seventh angular position and the eighth angular position:

the reduced disc rotates synchronously with the rotating rod between the seventh angular position and the eighth angular position; and the guide rod is prevented from moving along the second axis due to a second pin of the guide rod stands on the top surface of the clutch arm, wherein the second pin is attached to the bottom end of the guide rod.

8. The unidirectional spring assembly of claim 7, further comprising:

a top linear bearing comprising a top guide hole, the top linear bearing attached to a base plate; and a bottom linear bearing comprising a bottom guide hole, the bottom linear bearing attached to the base plate, the guide rod disposed slidably inside the top guide hole of the top linear bearing and the bottom guide hole of the bottom linear bearing, the top linear bearing and the bottom linear bearing configured to limit movements of the guide rod to a linear reciprocating movement along the second axis.

9. The unidirectional spring assembly of claim 8, further comprising a lip attached to the guide rod, the spring disposed between the lip and the top linear bearing, responsive to upward movement of the guide rod, the lip compressing the spring between the lip and the top linear bearing, the spring urging the guide rod to move downward by pushing the lip downwardly.

10. The unidirectional spring assembly of claim 9, wherein the concave surface comprises a right segment and a left segment, the right segment associated with the first end of the concave surface, the left segment associated with the second end of the concave surface, wherein:

responsive to movement of the roller on the right segment of the concave surface, the spring urges the reduced disc and the rotating rod to rotate around the first axis and in the first rotational direction due to the spring pushes the guide rod to move downward, and responsive to movement of the roller on the left segment of the concave surface, the spring urges the reduced disc and the rotating rod to rotate around the first axis and in the second rotational direction due to the spring pushes the guide rod to move downward.

11. The unidirectional spring assembly of claim 10, wherein the reduced disc comprises a first rod receiving hole at a center of the reduced disc, the rod receiving hole configured to receive the rotating rod.

12. The unidirectional spring assembly of claim 11, wherein the reduced disc comprises a keyway located immediately next to the rod receiving hole, the keyway configured to receive a key of the rotating rod, the key and the keyway configured to limit rotational movements of the reduced disc to a synchronous rotational movement with rotation of the rotating rod around the first axis.

13. The unidirectional spring assembly of claim 12, wherein the circular slot comprises an arc-shaped structure, the first axis passing through a center of the arc-shaped structure.

* * * * *